(12) United States Patent
Maes

(10) Patent No.: US 8,966,498 B2
(45) Date of Patent: Feb. 24, 2015

(54) INTEGRATING OPERATIONAL AND BUSINESS SUPPORT SYSTEMS WITH A SERVICE DELIVERY PLATFORM

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1045 days.

(21) Appl. No.: 12/019,335

(22) Filed: Jan. 24, 2008

(65) Prior Publication Data

US 2009/0193433 A1    Jul. 30, 2009

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06Q 10/06* | (2012.01) |

(52) U.S. Cl.
CPC ...................................... *G06Q 10/06* (2013.01)
USPC ............................. 719/313; 719/318; 719/319

(58) Field of Classification Search
None
See application file for complete search history.

(56) References Cited

U.S. PATENT DOCUMENTS

| | | | |
|---|---|---|---|
| 5,414,812 A | 5/1995 | Filip et al. | |
| 5,613,060 A | 3/1997 | Britton et al. | |
| 5,699,513 A | 12/1997 | Feigen et al. | |
| 5,737,321 A | 4/1998 | Takahashi | |
| 5,786,770 A | 7/1998 | Thompson | |
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A | 12/2000 | Ejiri | |
| 6,192,231 B1 | 2/2001 | Chapman et al. | |
| 6,192,414 B1 | 2/2001 | Horn | |
| 6,230,271 B1 | 5/2001 | Wadlow et al. | |

(Continued)

FOREIGN PATENT DOCUMENTS

| | | |
|---|---|---|
| EP | 2 034 748 A1 | 3/2009 |
| WO | 2007134468 A1 | 11/2007 |

(Continued)

OTHER PUBLICATIONS

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.

(Continued)

*Primary Examiner* — H S Sough
*Assistant Examiner* — Craig Dorais
(74) *Attorney, Agent, or Firm* — Kilpatrick Townsend & Stockton LLP

(57) ABSTRACT

A service-oriented approach provides for an integration of components that would otherwise be considered different and unrelated components, such as runtime, business support systems (BSS), operational support systems (OSS), and third party components. Such integration allows messages to be transformed and passed between components as necessary to perform a particular task. For example, a BPEL workflow can be initiated upon receiving a user request through a network and gateway layer which will direct provisioning, activation, and processing via these various components. Identities can be managed across these various layers to provide for seamless end-to-end integration.

27 Claims, 11 Drawing Sheets

(56) References Cited

U.S. PATENT DOCUMENTS

| | | |
|---|---|---|
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,094 B2 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,269,162 B2 | 9/2007 | Turner |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 | 8/2009 | Fiszman et al. |
| 7,590,696 B1 | 9/2009 | Odell et al. |
| 7,617,521 B2 | 11/2009 | Maes |
| 7,630,953 B2 | 12/2009 | Stauber et al. |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,370,506 B2 | 2/2013 | Maes |
| 8,401,022 B2 | 3/2013 | Maes et al. |
| 8,458,703 B2 | 6/2013 | Maes |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120729 A1 | 8/2002 | Faccin et al. |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |

(56) References Cited

U.S. PATENT DOCUMENTS

| | | |
|---|---|---|
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1* | 5/2007 | Greene ............... 705/1 |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1* | 11/2007 | Tumminaro ............... 705/79 |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |

(56) References Cited

U.S. PATENT DOCUMENTS

| | | | |
|---|---|---|---|
| 2009/0201917 | A1 | 8/2009 | Maes et al. |
| 2009/0222541 | A1 | 9/2009 | Monga et al. |
| 2009/0222858 | A1 | 9/2009 | Hjelm et al. |
| 2009/0228584 | A1 | 9/2009 | Maes et al. |
| 2009/0306834 | A1 | 12/2009 | Hjelm et al. |
| 2009/0328051 | A1 | 12/2009 | Maes |
| 2010/0037157 | A1 | 2/2010 | Chang et al. |
| 2010/0049640 | A1 | 2/2010 | Maes |
| 2010/0049826 | A1 | 2/2010 | Maes |
| 2010/0058436 | A1 | 3/2010 | Maes |
| 2010/0070447 | A1 | 3/2010 | Pfuntner et al. |
| 2010/0077082 | A1 | 3/2010 | Hession et al. |
| 2010/0083285 | A1 | 4/2010 | Bahat et al. |
| 2010/0091764 | A1 | 4/2010 | Merino Gonzalez et al. |
| 2010/0128696 | A1 | 5/2010 | Fantini et al. |
| 2010/0153865 | A1 | 6/2010 | Barnes et al. |
| 2010/0185772 | A1 | 7/2010 | Wang et al. |
| 2010/0192004 | A1 | 7/2010 | Bauchot et al. |
| 2010/0281488 | A1 | 11/2010 | Krishnamurthy et al. |
| 2011/0035443 | A1 | 2/2011 | Jensen |
| 2011/0125909 | A1 | 5/2011 | Maes |
| 2011/0125913 | A1 | 5/2011 | Maes |
| 2011/0126261 | A1 | 5/2011 | Maes |
| 2011/0134804 | A1 | 6/2011 | Maes |
| 2011/0134843 | A1 | 6/2011 | Noldus et al. |
| 2011/0142211 | A1 | 6/2011 | Maes |
| 2011/0145278 | A1 | 6/2011 | Maes |
| 2011/0145347 | A1 | 6/2011 | Maes |
| 2011/0182205 | A1 | 7/2011 | Gerdes et al. |
| 2011/0258619 | A1 | 10/2011 | Wookey |
| 2011/0280383 | A1 | 11/2011 | Varga et al. |
| 2012/0045040 | A1 | 2/2012 | Maes |
| 2012/0047506 | A1 | 2/2012 | Maes |
| 2012/0106728 | A1 | 5/2012 | Ghaffari et al. |
| 2012/0173745 | A1 | 7/2012 | Maes |

FOREIGN PATENT DOCUMENTS

| | | |
|---|---|---|
| WO | 2008111027 | 12/2008 |
| WO | 2008146097 | 12/2008 |

OTHER PUBLICATIONS

O'Doherty Phelim, "JSLEE—SIP Servlet", <http://java.sun.com/products/jain/JSLEE-SIPServiet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedlia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
U.S. Appl. No. 11/848,347, filed Aug. 31, 2007, Office Action mailed Oct. 29, 2009, 12 pages.
U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al., Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., With Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Final Office Action mailed May 10, 2010, 15 pages.
U.S. Appl. No. 11/877,129, filed Oct. 23, 2007, Advisory Action mailed Jun. 3, 2010, 2 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.

(56) References Cited

OTHER PUBLICATIONS

U.S. Appl. No. 10/855,999, filed May 28, 2004, Office Action dated Jun. 24, 2010, 20 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 11/024,160, filed Dec. 27, 2004, Final Office Action dated Jun. 1, 2011, 11 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/848,347, filed Aug. 31, 2007, Notice of Allowance mailed Mar. 2, 2012, 9 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/943,101, filed Nov. 20, 2007, Notice of Allowance mailed Dec. 9, 2011, 7 pages.
U.S. Appl. No. 11/951,500, filed Dec. 6, 2007, Advisory Action mailed Jul. 15, 2011, 3 pages.
U.S. Appl. No. 11/951,500, filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/024,160, filed Dec. 27, 2004, Notice of Allowance dated Aug. 4, 2011, 15 pages.

(56) References Cited

OTHER PUBLICATIONS

U.S. Appl. No. 11/939,705, filed Nov. 14, 2007, Office Action mailed Sep. 28, 2011, 15 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance mailed Aug. 22, 2011, 8 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Advisory Action dated Feb. 9, 2012, 2 pages.
U.S. Appl. No. 12/544,484, filed Aug. 20, 2009, Final Office Action dated Dec. 1, 2011, 8 pages.
U.S. Appl. No. 11/949,930, filed Dec. 4, 2007, Notice of Allowance mailed Mar. 19, 2012, 19 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Advisory Action mailed Jan. 5, 2012, 3 pages.
U.S. Appl. No. 11/969,343, filed Jan. 4, 2008, Final Office Action mailed Oct. 21, 2011, 11 pages.
U.S. Appl. No. 12/014,387, filed Jan. 15, 2008, Final Office Action mailed Apr. 5, 2012, 17 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Final Office Action mailed Feb. 1, 2012, 30 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.
U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
U.S. Appl. No. 11/357,653, Final Office Action mailed on Nov. 26, 2013, 25 pages.
U.S. Appl. No. 11/357,653, Non Final Office Action mailed on Mar. 27, 2014, 19 pages.
U.S. Appl. No. 11/969,343, Notice of Allowance mailed on Jan. 16, 2014, 6 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/018,718, Advisory Action mailed on Nov. 15, 2013, 3 pages.
U.S. Appl. No. 12/019,299, Notice of Allowance mailed on Jul. 3, 2013, 6 pages.
U.S. Appl. No. 12/045,220, Final Office Action mailed on Apr. 18, 2014, 20 pages.
U.S. Appl. No. 12/544,484, Non-Final Office Action mailed on May 8, 2014, 13 pages.
U.S. Appl. No. 12/791,129, Advisory Action mailed on Mar. 6, 2014, 3 pages.
U.S. Appl. No. 12/791,129, Final Office Action mailed on Dec. 20, 2013, 10 pages.
U.S. Appl. No. 12/791,129, Notice of Allowance mailed on Apr. 24, 2014, 9 pages.
U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/949,287, Final Office Action mailed on Nov. 25, 2013, 25 pages.
U.S. Appl. No. 12/957,697, Non-Final Office Action mailed on Mar. 20, 2014, 12 pages.
U.S. Appl. No. 12/957,740, Final Office Action mailed on Feb. 19, 2014, 18 pages.
U.S. Appl. No. 13/029,219, Advisory Action mailed on Jan. 2, 2014, 3 Pages.
U.S. Appl. No. 13/029,219, Non Final Office Action mailed on Apr. 11, 2014, 23 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.

(56) References Cited

OTHER PUBLICATIONS

U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/949,287, filed Nov. 18, 2010, Non-final Office Action mailed Nov. 19, 2012, 70 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final office Action mailed Mar. 20, 2013, 65 pages.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 12/957,697, Non-Final Office Action mailed on Jul. 2, 2014, 9 pages.

* cited by examiner

INTEGRATING OPERATIONAL AND BUSINESS SUPPORT SYSTEMS WITH A SERVICE DELIVERY PLATFORM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the interaction of system components, and in particular to the integration of independent components to allow the components to work together and delegate functionality in a processing flow.

At the present time there is a rapid convergence of technologies, such as telecommunications and information technology (IT) technologies. Confronted with huge infrastructure costs, telecommunication service providers are attempting to develop high value services in order to recoup their investments. At the same time, these providers have to deal with eroding revenue streams from traditional services (e.g., voice) and fend off aggressive new competitors such as virtual service providers and other Internet-based service providers that provide competitive services at very low costs. For service providers, it is essential to be able to rationalize their environment to build, deploy, and manage services as well as facilitate the development of attractive services by third party partner service providers.

In one example, the telecommunications industry is specifying and promoting new networks (such as NGNs or Next generation networks) that aim to provide support for the latest technologies (e.g., VoIP, multimedia streaming and messaging, and web 2.0) and an Internet-like user experience with viable business models for the operators. These networks can be used to provide new, attractive, and revenue generating multimedia ad real time services, for example. IMS (IP Multimedia Subsystem) is the most widely known example of such a new network technology. With its layered architecture, IMS provides the ability to deploy new exciting services (e.g., VoIP, Multimedia streaming and messaging and web 2.0), as well as convergence (e.g., VCC), making these services available through multiple access networks, such as FMC (Fix Mobile convergence) where the services are available through mobile and wired networks. Of course, the Internet is the other mainstream of NGN that enables web 2.0 services in general.

An example of a new and exciting service is triple play (voice+data+video) and quadruple play (e.g., adding IPTV, PSTN or mobile) combined with shared business support systems from a single operator or a service provider to a consumer. Demand for such converged services, combined with the convergence between wireless and fixed networks (e.g., broadband), further emphasizes the need to move away from silo-based architectures and instead rely on a horizontal, standards-based platform that enables convergence.

In telecommunications, service providers not only deal with the networks assets, platforms, and services, but must also support business processes to provide services to their customers and interact with their partners and suppliers, as well as operational processes to monitor and administer these assets. Tools, infrastructure, data repositories, and applications for performing these tasks are referred to as service provider business support systems (BSS) and operational support systems (OSS). BSS typically includes things that support the business aspects (e.g. CRM, PRM, ERP, Analytics, financial, revenue management) while OSS supports the execution of the business with aspects like monitoring, management, and administration; resolution of trouble; billing and/or charging; provisioning; activation; fulfillment; etc.) In any service provider, services and runtime interact with OSS and BBS. Today, OSS and BSS are often complex archaic systems designed for legacy networks where services, hardware, and network resources consist mainly of static components.

To successfully compete at Internet speeds, it is essential to evolve the OSS and BSS to better model and interact with the richer and more dynamically configurable nature of NGNs, service delivery platforms (SDPs), and applications built and deployed thereon. Platforms and applications have now become re-programmable and composable or configurable/customizable. They must be able to minimize time, risk, and effort in proceeding from service conception to revenue-generating deployment.

In one example, FIG. 1(a) illustrates a lifecycle 100 for various services, here for telecommunications processes, wherein it is desirable to minimize the time, risk, and effort in proceeding from service conception to revenue-generating deployment, and it would be desirable to automate such a process. It is further desirable to provide a near zero-touch service lifecycle wherein an end-to-end solution can easily be provided to industries such as the telecommunications industry with OFM and applications. As seen, the lifecycle runs from conception 102 through creation and assembly 104 to implementation 106, which then may require further conception, creation, and assembly. The service is then provisioned and deployed 108, finally arriving at the revenue generation and management stage 110.

FIG. 1(b) further illustrates the lifecycle by detailing the concept to cash value chain 150. The chain passes from creation to design and configuration for the service. After execution of an appropriate campaign, the service fulfillment stage occurs, where inventory is assigned, and the service is provisioned and activated. The service usage and charging phase is then carried out such that the service can arrive at the billing and collections state—arriving at revenue management.

It thus is desirable to be able to integrate the various systems utilized at these and other various stages in order to streamline the service lifecycle.

BRIEF SUMMARY OF THE INVENTION

Systems and methods in accordance with various embodiments provide for an integration of independent components that would otherwise be considered different and unrelated components, such as runtime, business support systems (BSS), and operational support systems (OSS) components. Such integration between pieces allows the components to then rely entirely upon a service-oriented architecture (SOA)-based approach, which allows messages from one component to be transformed and passed to the appropriate component to perform a particular task. While various embodiments will be described with respect to telecommunications and similar technologies, it should be understood that there are a number of technologies, service providers, enterprise applications, infrastructure, and other such entities that can utilize and take advantage of aspects of the various embodiments. Various embodiments can be utilized to provide products or packages such as pre-packaged business processes that include not only the processes but also the integrations of the applications, infrastructures, and elements that are involved for any particular industry. For telecommunications, for example, the product can include OSS, BSS, SDP, and network integration in a box, and for an IP network can include Internet and telecommunications functions (e.g., charging, policies, security, quality of service, etc).

In one embodiment, information for an application such as a CRM application is collected and retrieved when a customer starts interacting with the system. Some operations are executed across different components, and in one example a workflow (such as a BPEL workflow that may be coupled to a ESB or with a EDA (event drive) architecture) is kicked off that initiates any composition or decomposition, and that passes the flow and any associated processing to the various components that may be required. In this example, part of the processing is performed by starting the activation and provisioning of the service delivery platform (SDP) and applications. If an account needs to be created in SDP or an application, for example, the flow can pass a request to the runtime component(s) to create the account and service. The workflow can also pass a request to an appropriate component to determine the pieces to be provisioned to activate a service or perform another such action. The flow then can pass to a billing or other such system to perform actions needed for billing, information updating, etc.

Each of these components can operate independently to perform a task, and can come back to the flow when that task is completed (successfully or unsuccessfully). In one embodiment this flow is a BPEL workflow, while in other embodiments this can involve SOA and EDA (e.g., BPEL orchestrating an ESB), with messages being further transformed to each target component based on canonical data model information. Error and/or result messages are returned accordingly, as well as any other notification/event that the applications may throw. In the example, once the various components are provisioned it is possible to come back and begin activating each component, as the components are enabled to begin processing for the user. Once the components are activated, the service is ready for use.

An application or component thus is able to integrate with other such applications or components to delegate some functions and/or subsequent steps of the flow by generating a message that describes request or status, putting it on an SOA/EDA infrastructure (e.g., BPEL, ESB) where the messages may be transformed to a canonical data model. The canonical data model can model the generic status, state, or session before itself being transformed into a message that can be understood by the target. The overall state can be kept in the data model, but the task is passed to the target, etc., when all the processes are finished. Errors can be modeled and handled in a similar fashion. This way an application is able to delegate or pass the hand to other applications, or an overall process can orchestrate the application, therefore easily allowing the definition of an overall business process supported by the integration. These business processes can be pre-packaged business flows, patterns, or processes, for example.

In certain embodiments, the SDP (or the runtime for the network) and the OSS/BSS components utilize, are developed for using, or are compatible to use the same managed identity so that, independent of the particular network, it can be ensured that the user is the same, and the user identity can be managed appropriately across different networks. Systems and methods in accordance with the various embodiments can combine components such as OSS/BSS components using a service oriented architecture (SOA) and an event driven architecture (EDA), and build the components on the same stack, or at least on a same identity framework, so that they can share managed identities. By integrating components such as SDP, OSS, and BSS components, an end-to-end integration can be provided that enables consistent OSS/BSS/SDP coexistence across multiple network technologies, enabling evolutionary deployments of NGNs, as well as enabling consistent OSS/BSS/SDP and service sharing across multiple network technologies or providers, enabling true convergence. Such an approach also provides for business-driven management with almost zero touch of all the service provider systems.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments overcome the aforementioned and other deficiencies by providing for an integration of components that would otherwise be considered different and unrelated components, such as runtime, business support systems (BSS), and operational support systems (OSS) components. Such an approach allows components to then rely entirely upon a service-oriented architecture (SOA)-based approach, for example, which allows messages from one component to be transformed and passed to the appropriate component to perform a particular task. More importantly, it allows a component to delegate a task to another task, for example, or to pass the context to the next component to drive the next step of the target end-to-end business process or life cycle management of a service.

Figure 1A:
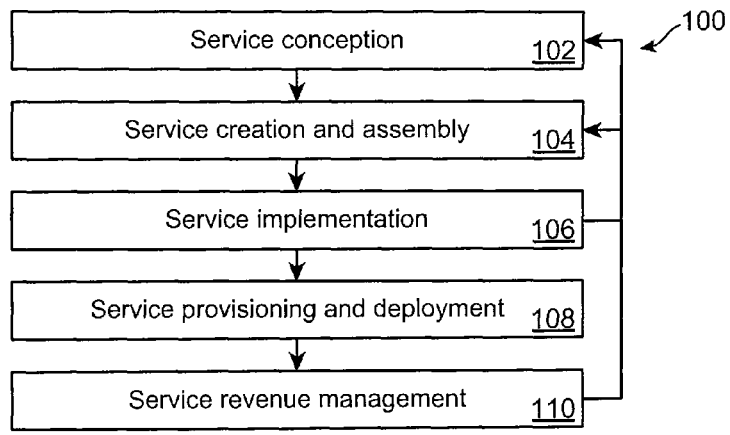
FIGS. 1(a) and (b) illustrate examples of a service lifecycle that can be automated in accordance with various embodiments.
Figure 1B:
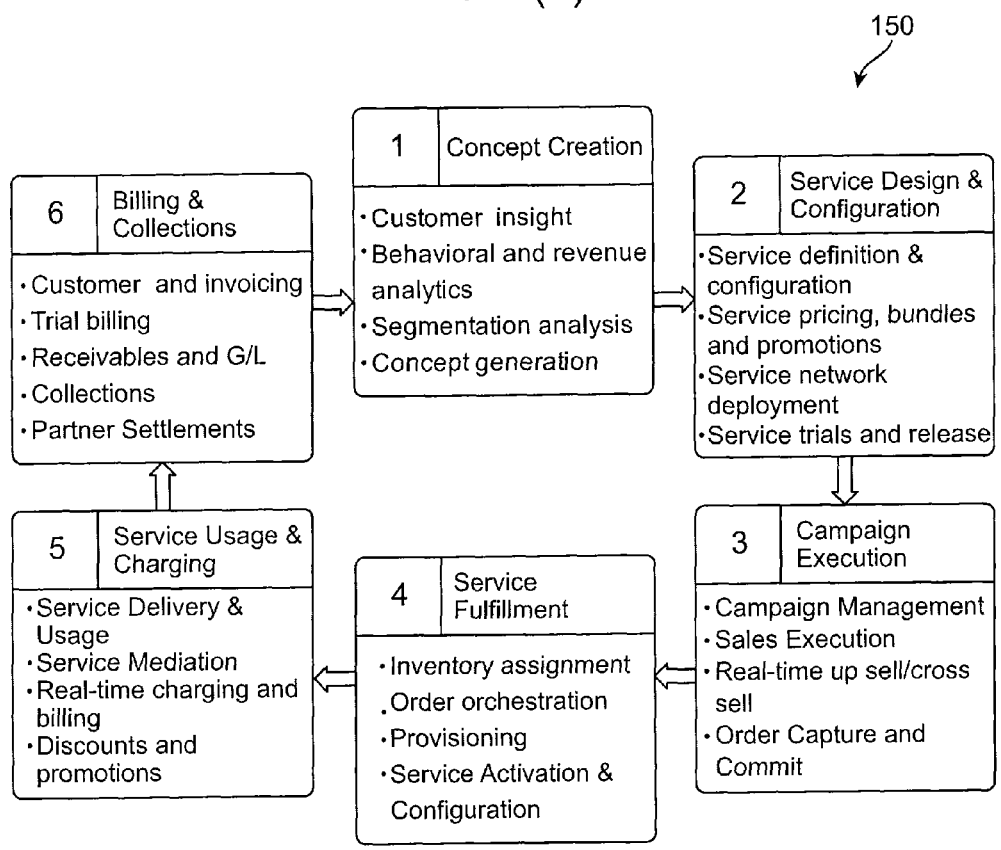
Figure 2A:
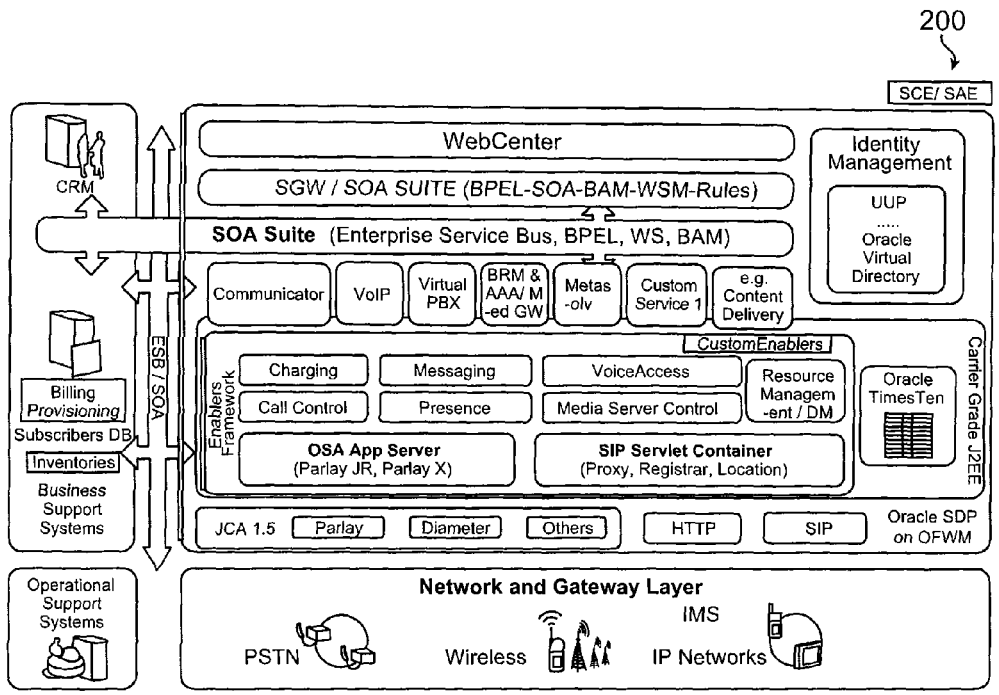
FIGS. 2(a) and (b) illustrate a service delivery platform-based architecture that can be used with various embodiments of the present invention.
Figure 2B:
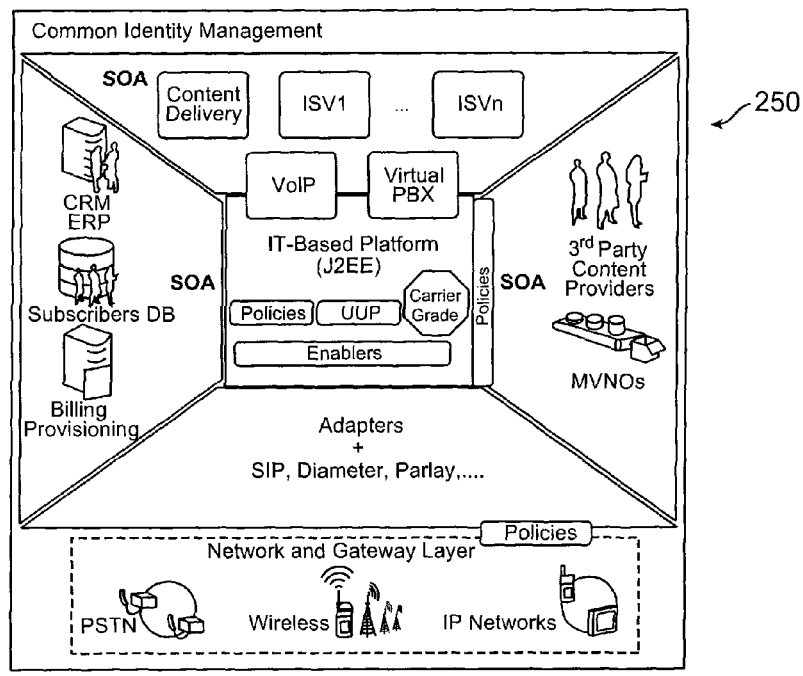

FIGS. 2(a) and 2(b) illustrate an exemplary service delivery platform (SDP)-based architecture 200 that can be used in accordance with one embodiment. In the exemplary architecture 200 of FIG. 2(a), the SDP includes a horizontal, standards-based platform that abstracts the underlying network resources and follows a service-oriented architecture (SOA). Further information about such a service delivery platform is detailed in co-pending U.S. patent application Ser. No. 11/357,653, filed Feb. 16, 2006, entitled "FACTORIZATION OF CONCERNS TO BUILD A SDP (SERVICE DELIVERY PLATFORM)," which is hereby incorporated herein by reference. In one embodiment, the SDP utilizes a horizontal SOA platform based on the Java 2 Platform, Enterprise Edition (J2EE). The SDP includes a converged container based on Java Specification Requests JSR 116/289 and JSR 32, which includes SOA SIP AS, OSA AS, and telephony AS as a J2EE converged container. The SDP also exposes mobile, voice, and other communications enablers.

In FIG. 2(b), the SDP configuration 250 implements the desired functionality on top of an underlying J2EE core provided by the application server. It is valuable to have a common identity managed across all the elements and the network, as well as a common view of all the data about a principal. A basic approach to providing a service delivery platform starts with a standards-based IT platform (e.g., J2EE) and makes the platform carrier grade, and extends beyond HTTP to protocols such as SIP, Diameter, and Parlay. To support the key protocols relevant to Telecommunications, for example, the SDP can provide support for SIP/ISC, Diameter and Parlay CORBA as well as adapters to messaging gateways. A standard approach can be used to build adapters to any other resource or protocol using JCA 1.5, for example. Enablers are provided as reusable components that abstract the network resources and standard northbound interfaces. IT/SOA then can be used to provide services such as revenue generating services, utilizing SOA-based policies and business rules (e.g., from third parties). The platform then can provide for SOA-based integration of OSS, BSS, and SDP. Exposure to third party content and service provider can be achieved by SOA to expose, integrate and enforce policies. SOA also can be used to also support and rationalize policy management and evaluation throughout the service provider environment.

The SDP can be thought of as a service layer solution that can be deployed on Oracle fusion middleware/OC4J as well as JBOSS, BEA Weblogic, and IBM Websphere, for example. While SIP is described as a first class citizen protocol besides HTTP, other protocols can be supported out of the box using a recipe for JCA 1.5 adapters to Parlay CORBA, Diameter, Messaging protocols etc. The J2EE container is converged (i.e. every object from SIP, HTTP, J2EE object etc can share context and interact with each others, when it makes sense) and carrier grade (details provided after). This includes the use of TimesTen and open source technologies like JGroups, and also can be able to rely on Tangosol Coherence to provide session replication and efficient distributed cache. The enabler framework includes an OSA AS (i.e. Parlay JR 5.1 J2EE local interface and Parlay X 2.1). These are realized on SIP and Parlay JCA and can be realized on others as well. A JSR 116 SIP servlet converged container (SIP AS) can be used for IETF and IMS (ISC) deployments. The SIP servlet container also can include all the necessary components to deploy a vanilla IETF SIP network (i.e. proxy router, edge server, registrar/location, STUN server, support for ENUM server, application dispatcher).

A set of enablers can be provided and implemented on SIP and Parlay. These enablers can include, for example, a presence enabler that follows OMA SIP/SIMPLE Presence, XDM and RLS enabler specifications. It is an out of the box IMS presence server and SIP/SIMPLE presence server. It can also aggregate presence from other networks (e.g. Parlay network presence) and provide northbound parlay X interface for application to use presence without participating to the presence network. Location data can be modeled as a presence attribute using an extensible presence data model. A multi-channel A2P and P2A messaging enabler can allow for sending and receiving messages in channels like SMS, MMS, email, IM (XMPP), SIP and others. Enablers can allow for multimedia and multiparty call control over SIP (internet and IMS) as well as Parlay. Enablers can provide service level charging that exposes online, offline charging balance inquiry and tracking, pre-rated charging etc integrated to Ro/Rf (AAA media gateways), Parlay and Oracle BRM. Others can be similarly integrated via JCA 1.5 adapters to be developed by third parties. A media server control enabler and voice access enablers that are the MRFC functions of MRF are able to control a wide variety of voiceXML servers, IVRs, announcement servers, and media servers (e.g. MSML, MSCML, MSCP, and MGCP). Protocols not available out of the box can be built on SIP AS or using JCA 1.5.

The whole platform can be used with identity management services. In one example, a UUP (unified user profile) built on a Virtual Directory offers an identity managed single view of the information about the subscribers (or other principles) from OSS (e.g. assets in inventory), BSS (e.g. bill and subscriptions), network (e.g. HSS via Sh), Dynamic information (e.g. presence or location) and any other service level specific information (e.g. credentials, and application or enabler data).

In one embodiment, the service delivery platform (SDP) is a standards-based horizontal platform that abstracts the underlying network resources, follows a service-oriented architecture. The platform can be a SOA platform based on J2EE, which includes a J2EE converged container and exposes various communication enablers. Enablers can include, for example, call control enablers and media server control enablers as discussed elsewhere herein. Further, interfaces can be exposed to applications and other enablers and resources for usage of various functionality. Some or all of the interfaces can be standard or standardizable, as is its behavior, such as may include OMA, Parlay, Parlay X, and WS components. For the purpose of the SDP, these enablers can provide various MVC (Mobile/Voice/Communications) functionality. The applications can be built using one or more enablers, and can add notions like a user interface (UI), user management, and charging, either in the code or via delegation and orchestration.

Figure 3:
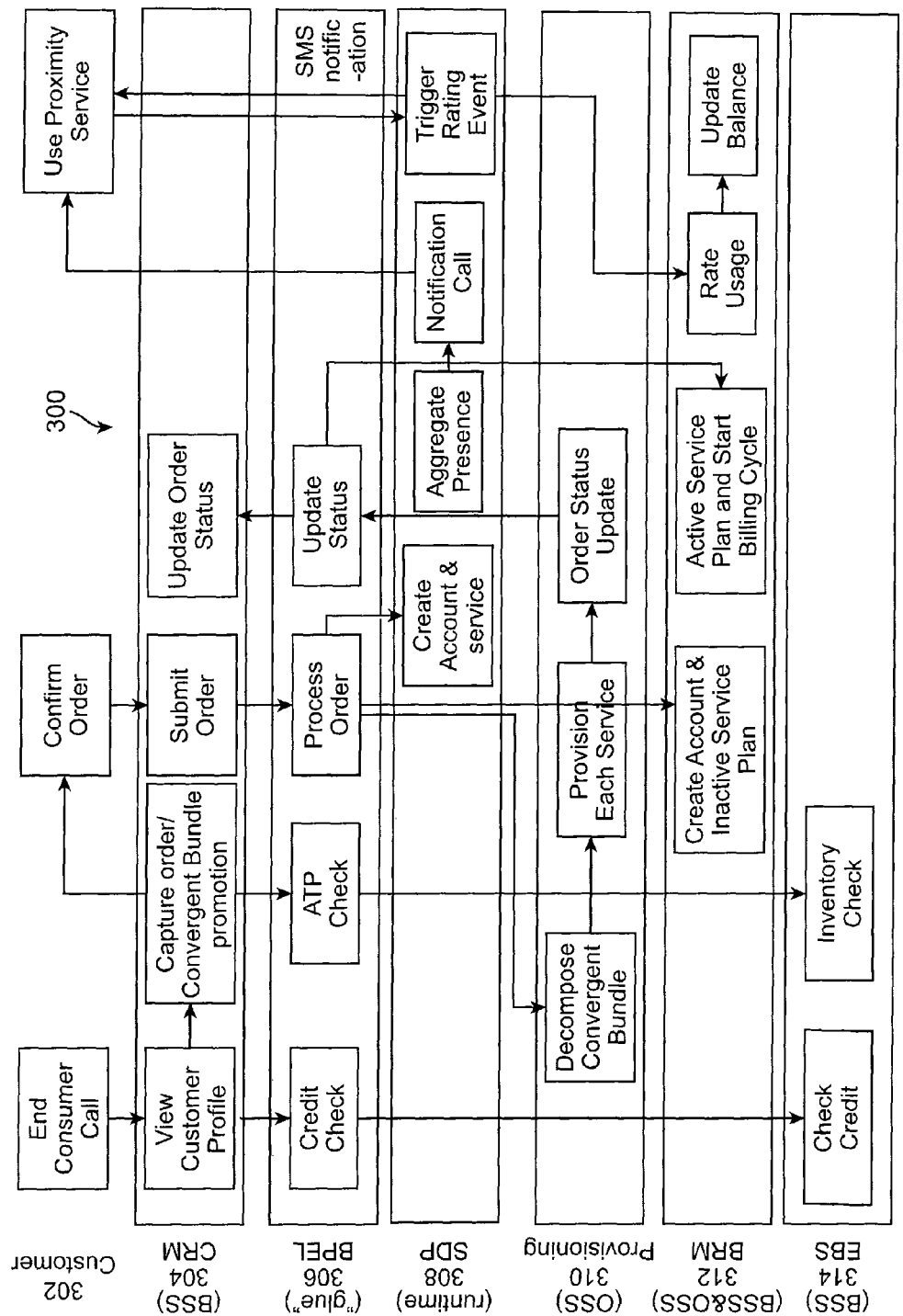
FIG. 3 illustrates an exemplary flow that can be utilized in accordance with one embodiment of the present invention.

FIG. 3 illustrates an exemplary flow 300 through the components in an integrated architecture such as that described with respect to FIGS. 2(a) and 2(b), for illustration purposes. This example illustrates integration with BPEL (business process execution language) instead of a full service-oriented architecture (SOA) and event-driven architecture (EDA) where transformations and exchanges occur on an Enterprise Service Bus (ESB) with respect to a canonical data model that also handles error message, exceptions, etc. This is a conventional SOA/EDA approach, as described hereinafter. A complete detailed architecture for one example rather follows FIGS. 5(a)-(c). In this example, a customer is interacting with an operator system through self-service (e.g., a Web site or IVR) or via a CSR (e.g. a call center or processing of point of sales/froms). The various components and operations are shown at different levels in this example flow, including a customer level 302, a BSS level (here a CRM system component self service or call center/CSR console) 304, a workflow level 306 (such as a BPEL workflow level in one example—which is used to easily illustrate the invention but alternatively could be accomplished through message transformations (e.g., EEB+BPEL), EDA, and SOA as discussed elsewhere herein, such as with respect to FIGS. 5(c) and 6, a runtime application or service level (here the SDP) 308, an OSS level (here a provisioning, activation component and inventories/RMO (resource management operations)) 310, a combined (to some extent) OSS and BSS level (here a Billing and Revenue Management (BRM) component) 312, and another BSS level (here an E-Business Suite (EBS) component) 314 responsible for ERP, Financials, etc. The workflow component 306 acts as the "glue" for bringing the various components together and integrating the components. In theory the transformation is implemented based on the canonical data model that also manages the overall process, and stores/understand its status, such that the SOA/EDA can be used to delegate functions from one component to the other, as well as to allow marshalling a complete process flow from one element to the other and error message handling supported by an architecture such as that illustrated in FIGS. 5(a)-(c). Such a process can be accomplished in a number of ways for the customer, such as in a self-service mode, through a Web page, or interacting with a live operator.

When the customer starts interacting with the system in this example, information for the CRM application is collected and retrieved. Some operations can be executed across different BSS components, such as where customer is going through a process to order a phone and it is necessary to check the types, availability, quantity to be shipped, etc. Such an operation can be implemented by having a BPEL workflow going from one BSS application to another. Components such as a credit check module and an inventory check module are shown at the bottom as BSS components (here done by querying BSS ERP applications and inventories in RMO). Various things can occur during processing of the order, such as having CRM suggesting an item at a reduced price upon purchasing a certain level of service, as well as other types of bundling, campaigns, and promotions. One the order is confirmed at the customer level, the order is submitted by the CRM system, a BSS component. As can be seen, submitting the order kicks off a BPEL workflow which initiates the composition/decomposition of the order and passes the order processing to the various components that may be required, for example, for order decomposition and fulfillment. In this example, BPEL (i.e., SOA/EDA in the bigger picture) performs parts of the order fulfillment by starting the activation and provisioning of the SDP/applications and passing decomposed order fragments to BRM in order to create accounts and Metasolv to start further order fulfillment, activation, and provisioning. Accordingly, if an account needs to be created in SDP or an application, for example, the flow can pass a request to the runtime component(s) to create the account and service. The workflow can also pass a request to the OSS to determine the pieces to be provisioned to activate that service for this order. The flow then can pass to a billing system to create the billing information, as well as to store address, user, and other information that will be needed for billing. The rates can be associated with different services for the order, so that information can be stored as well.

As can be seen, each of these components can be running independently to perform at least one of these tasks, and can come back to the flow when that task is completed (successfully or unsuccessfully). In one embodiment this flow is a BPEL workflow, which in other embodiments this can involve SOA and EDA, with messages being further transformed to each target component based on canonical data model information. Error and/or result messages are returned accordingly, as well as any other notification/event that the applications may throw. The overall process may be passed from an application/component to a component, or marshaled from the overall canonical data model to execute an overall SOA/EDA process. This may be triggered externally by other events, command lines, scheduled events, etc. In this example the last component to return to the workflow is the OSS Metasolv provisioning, activation, inventory management and order fulfillment application that indicates (after decomposing part of the order and ensuring activation and provisioning of all items and fulfillment (e.g., by for example ensuring monitoring of shipping the items such as phones or modems to the user), either via direct monitoring of the supply or via interaction with the ERP that it directly drives) that everything to be fulfilled in the order has been activated, provisioned, or otherwise fulfilled. In the example, once the various components are provisioned it is possible to come back and begin activating each component, as the components are enabled to begin processing for the user. Once the components are activated, the service is ready for use. In the example illustrated here, example, the service is a proximity service where monitoring is done of the presence and location information, and a proximity is detected. When a customer is close to a particular location, a notification takes place to a proximity service that initiates a call or SMS exchange (or another appropriate messaging channel) with the user, and a charge is generated for the activity.

In this example, the user is notified based on preferences that were selected when the user subscribed to the proximity service offered with a wireless plan that was bundled with the phone ordered by the user. Preferences can include, for example, to be notified when a friend or particular store is nearby. So in one example when a user is within a specified proximity of a friend, the user can select to receive an automated call informing the user of the proximity, and asking whether the user would like to call the friend (such as by selecting "1" to call or "2" to refuse). In another example, when a user walks by a location of a coffee franchise, the user can select to receive any offers or discounts for the franchise. For example, the user can hear the offer, then select "1" to accept the coupon to the device or "2" to refuse. Alternatively, a similar exchange can occur via messaging using a messaging enabler described in such as is described in U.S. patent application Ser. No. 11/939,705, entitled "Intelligent Message Processing," filed Nov. 14, 2007, which is hereby incorporated herein by reference. The user is then charged accordingly, such as for calling to speak to the nearby friend or receiving the coupon. Where the user accepts the coupon, it is possible to charge the user, the franchise, or even the service provider for the call, as well as any discount or free drink given using the coupon. Throughout the system the bill of the subscriber and of the franchise can be seen in real time, such as by using the dashboard of Oracle BAM (Business Activity Monitoring), which monitors all usage of the system. Bills can be monitored and the data can be captured in Oracle Financials (books) and analyzed via Business Intelligence like Oracle BI That charge will then be reflected in the billing system. In one example, promotions can be suggested to a user, such as when a user is near a coffee shop location that offers a discounted drink, etc. It is then possible to also work with third party partners (such as a coffee retailer who would have the business where the promotion kicks in) in such a way that bills can be determined according to the promotion/pricing as agreed. In this case, the coffee retailer may be charged for the customer to view or select to obtain the promotion, or the service provider might instead decide to pay the retailer for the promotion. The third party then can in real time see the resulting revenue sharing balance and the current usage statistics.

In certain embodiments, the SDP (or the runtime for the network) and the OSS/BSS components utilize, are developed for using, or are compatible to use the same managed identity so that, independent of the particular network, it can be ensured that the user is the same, and the user identity can be managed appropriately across different networks. Often current systems perform identity management at the network layer, or maybe at the service level when the identity is exposed to a third party. Unfortunately, those two identities are rarely linked and managed, and further there is no existing link with the OSS/BSS components as the components exist in a separate layer or environment. Systems and methods in accordance with the various embodiments can combine these components using a service-oriented architecture (SOA), and build the components on the same stack so that they can share managed identities. As a result it is not possible to truly share services (possibly adapted to the capability of network of user terminal) on different access networks, much less to share, coordinate, or continue sessions across networks.

By integrating components such as SDP, OSS, and BSS components, an end-to-end integration can be provided that enables consistent OSS/BSS/SDP coexistence across multiple network technologies, enabling evolutionary deployments of NGNs, as well as enabling consistent OSS/BSS/SDP and service sharing across multiple network technologies or providers, enabling true convergence. Such an approach also provides for business-driven management with almost zero touch of all the service provider systems.

A service (i.e., an application or set of applications that can be sold or offered to a customer) can be conceived and defined in terms of its dependencies on service provider's assets. These dependencies include the type of asset or required feature, a type of settings, a location for the assets to support the service, how the assets should be assigned, required bandwidth, etc. An OSS/BSS service creation tool allows capture of that information as metadata associated to the service. The tool can also associate metadata to all the assets in the service catalog and inventory of the service provider to help match capabilities of assets with dependencies by describing these capabilities. A BSS service assembly environment is then a tool or a process that allows assembly of a defined service based on available assets in catalog and inventory. Missing assets may kick in OSS/BSS (e.g., ERP) processes to acquire the missing items or build the item (e.g. as a software application via software design or composition) on the SDP. They also can raise alerts to contact the subscriber and see if the service provider should upgrade, sell other services, refund, etc. When software is configured, reprogrammed, or composed to produce a new application, metadata is associated therewith. When making it available in a software catalog or registry, for example, a SOA flow can be kicked in, such as is described in more detail in co-pending U.S. patent application Ser. No. 12/019,299, filed Jan. 24, 2008, entitled "Service Oriented Architecture (SOA) Management of Data Repository," which is hereby incorporated herein by reference. This flow/process places the appropriate data in catalogs such as a product catalog, service catalog, and inventories of assets to reflect the new items. The catalogs of product, services, and/or inventory are therefore appropriately updated with the available new service. Through OSS/BSS tools (e.g., CRM) it is now possible to price, create campaign promotions, bundle recommendations, etc., which can be sold along with the rest of the offerings. The service can then be deployed and provisioned, activated or run, and charged or billed for usage on the SDP along with appropriate network provisioning. Again, catalog and inventory are provisioning and deployed assets are administered and monitored by the OSS.

Figure 4A:
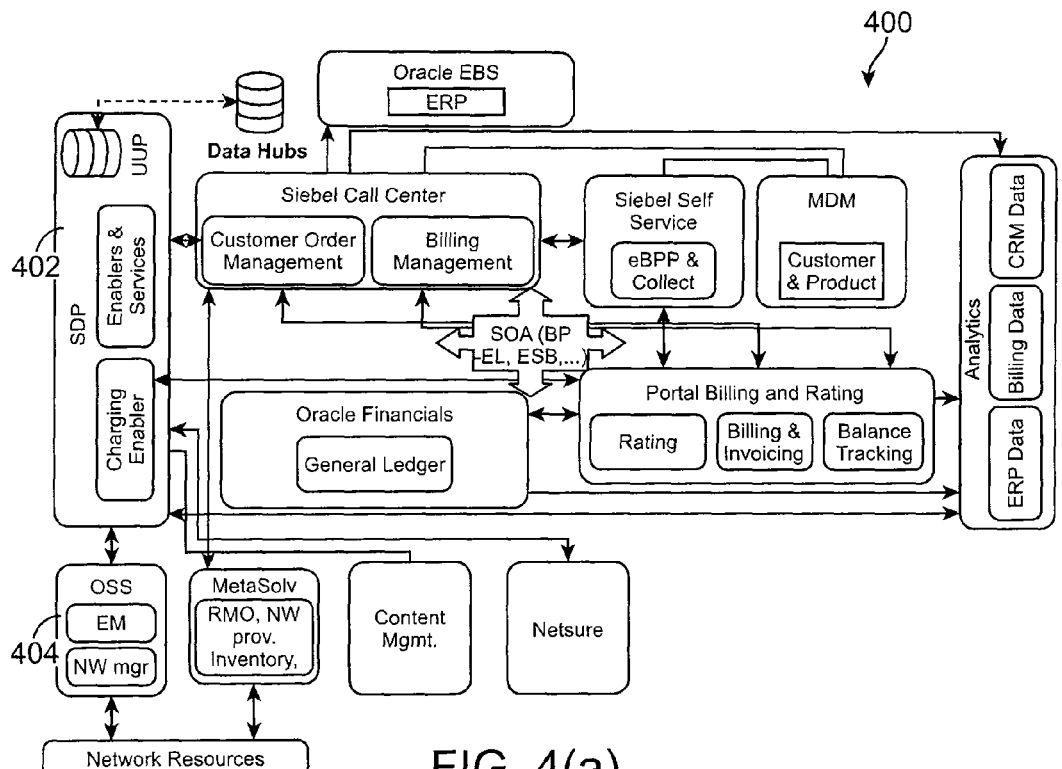
FIGS. 4(a) and (b) illustrate packaged and integrated OSS/BSS/SDP solutions and operations that can be used in accordance with various embodiments.

FIGS. 4(a) and (b) symbolically illustrates exemplary OSS/BSS/SDP integrations 400, 450 that can be used in accordance with various embodiments. It should be understood that these are merely examples and it does not matter which OSS/BSS applications are used. Further, interfaces, messages, models, and other aspects may change from one application to another, for example, as would be understood to one of ordinary skill in the art in light of the teachings and suggestions contained herein. With CRM, a subscriber or third party can create an account either in self service (e.g., web, IVR) mode or assisted by a CSR (e.g., call center, joint IM web session, Form mailed, or Point of sale). Upon creation of the customer account in the CRM (e.g., a data hub), these accounts are appropriately provisioned in the billing system and in the runtime (as user identities for the SDP 402), as well as when needed in the network or in the service delivery platform (e.g. using SOA/BPEL and/or MetaSolv that provides activation and provisioning and performs at least some of the fulfillment (possibly delegating some of it to ERP)). Subscribers can then subscribe to services and third parties can sign-up for services or other contractual terms. Promotions or campaigns, for example, can suggest additional offers to the customer or partners. Credit or balance checks, as well as other business steps, may be taken. In addition to updates of the customer or partner data hub, upon a subscription or agreement the customer management orchestrates the necessary steps such as the billing system being provisioned with rating and billing terms, and the SDP and services being provisioned (e.g., authorization table, subscription information, preference, settings, policies that reflect SLAs, etc.). Network resources may also be provisioned when required, which may involve allocating assets, sending products, updating inventories, and other steps in the ERP system. The MDM (master data management) module shown can include two datahubs, including UCM (Universal Customer Master) and PIM (Product catalog) modules, for example. As can be seen in the figure, the system also can utilize content management as is discussed in more detail below.

The subscriber or third party is able to interact with the services on the SDP. Network and service level charging may take place that results in balance updates according to the contracts. Revenue sharing credits may also be provided to other third parties. Usage itself can be monitored via BAM (Business Activity Monitoring) in real time, and BI (business intelligence) can be done in a batch/deferred mode of the SPD. In real time, the BAM information and balance updates can be reflected in the general ledger of the service provider, as well as in its analytics and BSS modules. Throughout operation, the OSS 404 monitors and/or administers the overall system. This can be done at the level of the middleware that runs the SDP and OSS/BSS, as well as at the level of the network via integration with the network OSS. Faults can result into alerts to the OSS that rely on inventory and subscription information to detect affected assets and customers, as well as to support them. Similarly, CRM support can raise alerts in the OSS. These are just a few examples of integration flows that illustrated the power of the approach.

Figure 5A:
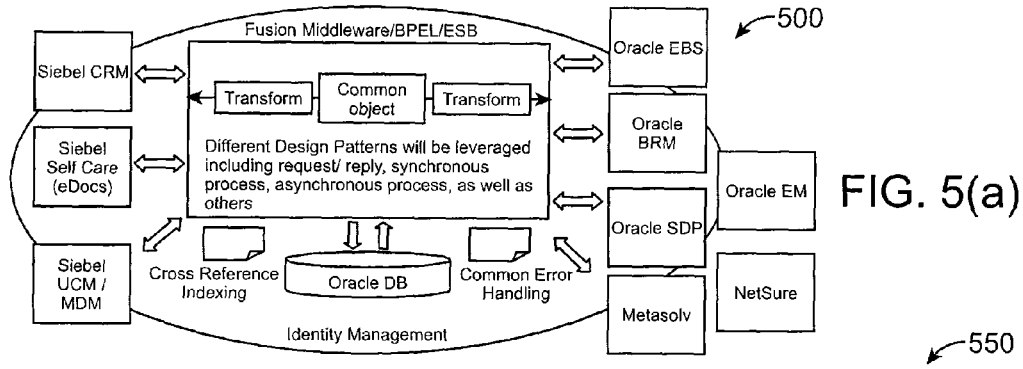
FIGS. 5(a), (b), and (c) illustrate examples of architectures that can be used in accordance with one embodiment of the present invention.
Figure 5B:
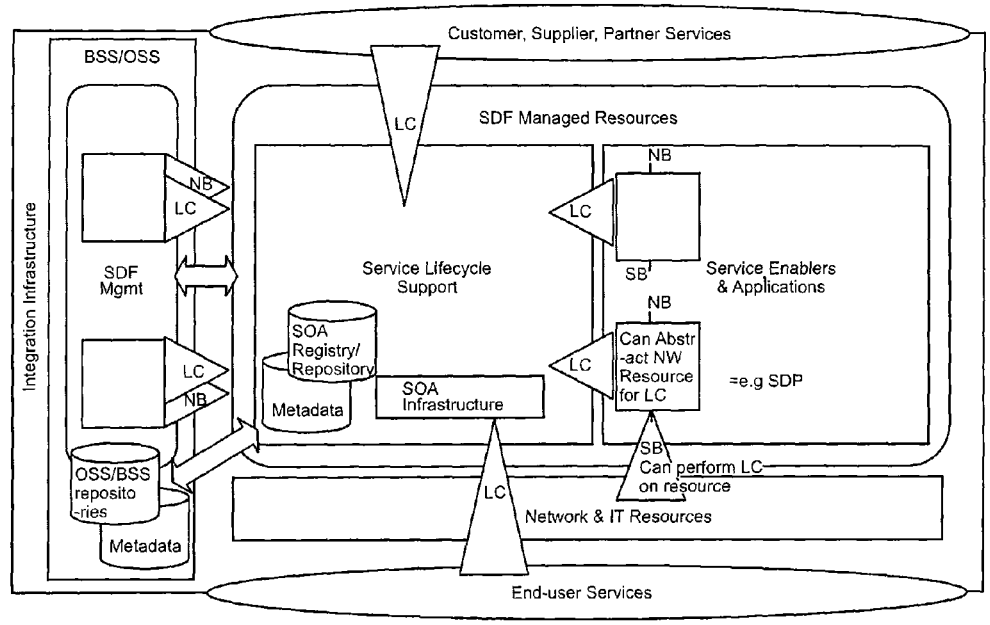
Figure 5C:
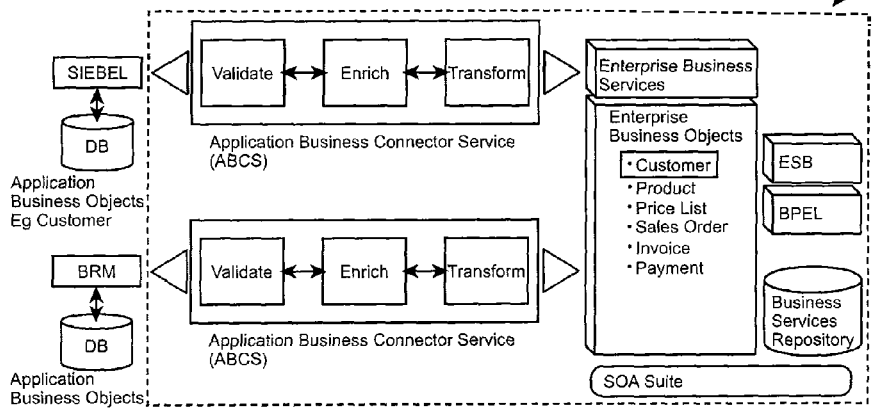

FIG. 5(a) illustrates an integration model 500 that can be used in accordance with one embodiment of the present invention. Here, the integration is based on standard SOA using BPEL, EBS, and Web services (WS) with a canonical object model and appropriate transformations. Such an architecture provides for a number of OSS/BSS/SDP integration points. For example, a provisioning integration point allows for SDP and service provisioning via BSS. This can include, for example, customer facing catalogs, inventories, application configuration, and provisioning data. Policies provisioning for policy enforcement is a particular case. Another integration point involves charging, including service or transaction charging as well as network or traffic charging. While the integration illustrated in FIG. 5(a) is the essence of one embodiment, it should be understood that any other type of integration implementation can also be supported, such as is illustrated in the arrangement 550 of FIG. 5(b). FIG. 5(c) illustrates another integration example 580, wherein an existing customer record is translated into a generic Enterprise Business Object (EBO) and then pushed out to BRM in the format required.

Figure 6:
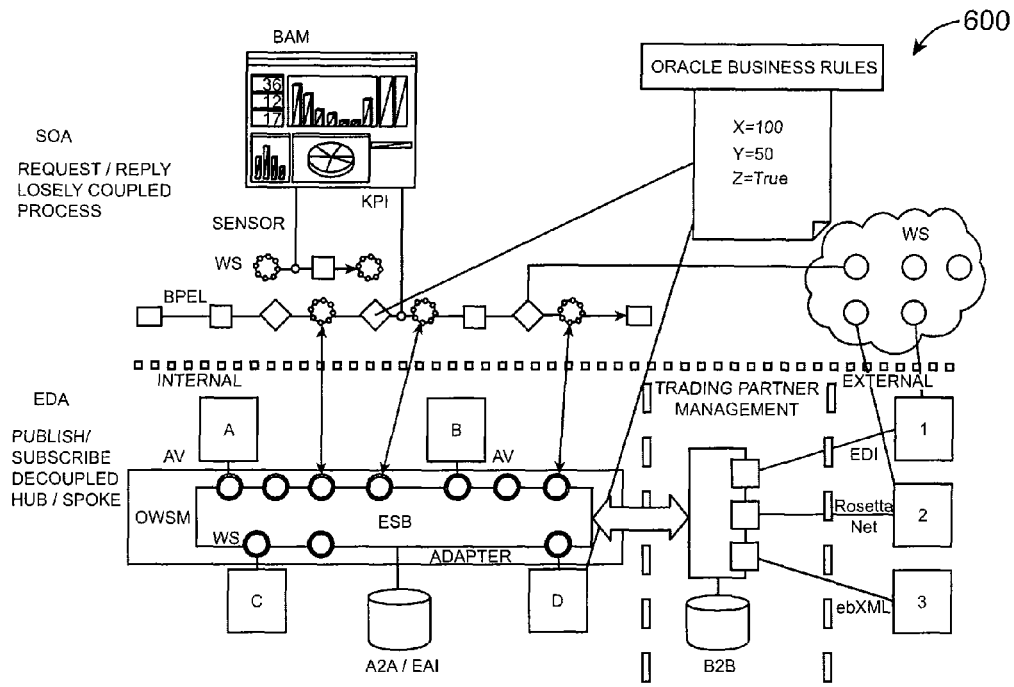
FIG. 6 illustrates a typical SOA+EDA architecture and infrastructure that can be used with various embodiments.

An aspect such as charging can be accomplished using, for example, an OMA charging enabler, Diameter Ro/Rf or Parlay. FIG. 6 illustrates an architecture 600 relating a full service-oriented architecture (SOA) and event-driven architecture (EDA) in accordance with one embodiment. In this particular example, a BPEL workflow and Web services are used to coordinate calls between the SOA and EDA components, although this is merely for purposes of illustration and is not necessary as discussed above. Using such an approach, SOA is able to achieve loose coupling among interacting software agents. In this context, a service is a unit of work done by a service provider in order to obtain a desired result for a user or customer.

Another integration point involves Identity Management, data hubs, and profiles. This can include, for example, account information, subscriber profile, principal data hubs, and HSS. The integration can provide for virtual views and common provisioning. Sharing BSS with Identity Management is mandatory for convergence (e.g., FMC). More detail can be obtained in the "Service Oriented Architecture (SOA) Management of Data Repository" application incorporated by reference above. Identity management can take place across the various applications such that identities can be managed across applications, providing for functionality such as single sign-on, federation, and anonymization.

Figure 4B:
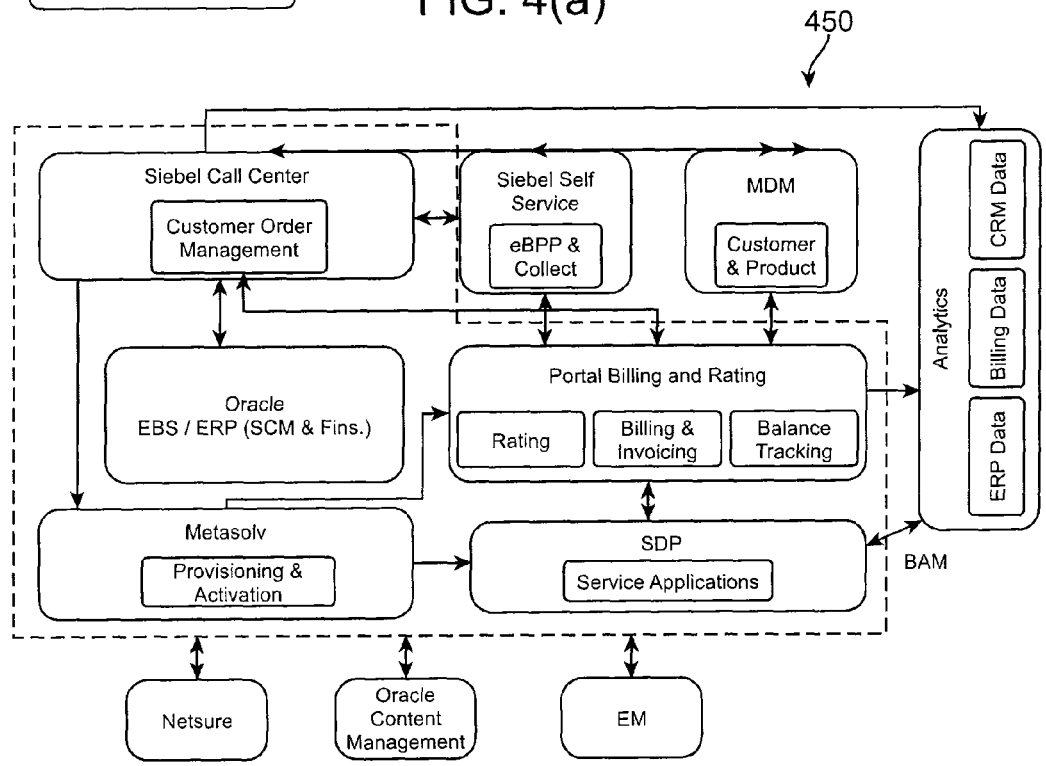

Another integration point involves the OSS/BSS support of run time applications, where BSS steps can be done by an application or third party. The BSS then also can provide application logic, as applications can rely on BSS functionality, such as to develop a content delivery platform. At this level, for example, content management can also be integrated so that an application such as CDS can be implemented by calling the function provided in OSS/BSS via a composition of Web services, for example. More detail can be found in U.S. patent application Ser. No. 11/138,844, filed May 25, 2005, entitled "Platform and Service for Management and Multi-Channel Delivery of Multi-Types of Content," as well as U.S. patent application Ser. No. 11/357,652, filed Feb. 16, 2006, entitled "Service Level Digital Rights Management Support in a Multi-Content Aggregation and Delivery System," and U.S. patent application Ser. No. 11/671,127, filed Feb. 5, 2007, entitled "Orchestration of Components to Realize a Content or Service Delivery Suite," each of which is hereby incorporated herein by reference. The presence of content management is illustrated in FIG. 4, for example, which allows content to be treated directly as a new product/service sold, recommended campaign, etc., to customers. This can be achieved by allowing OSS/BSS functions to be exposed as enablers or reusable pieces of code that drive the function (in this case from OSS or BSS) and expose it via a North bound interface in ways that are independent of the implementation/OSS/BSS details. Examples are discussed below with functions such as charging and rating exposed as a charging enabler and resource management enablers.

Another integration point (OSS) is at the level of the platform and service management integration with OSS network management and inventory systems. Every component in an SDP and OSS/BSS application can be managed via JMX, for example, and viewed in a JMX management environment such as Oracle EM. The component itself then is able to report alerts and management information to other management systems via WS/SOA/EDA or via SNMP. In this way network management can be shown in EM, or EM can be shown in network management. Further, SNMP can be used. In one embodiment, EM can generate SNMP towards other OSS management systems, such as HP OpenView, CiscoWorks, Tivoli, etc.

Other integration points include run time analytics in BSS flows: run time information from BAM can be introduced for BI and analytics in a product such as Oracle analytics. Aspects of the service creation and assembly environment, including those described above, can combine BSS SCE/SAE with SDP tools or SCE.

Other points include run time service level agreement (SLA) and quality of service (QoS) enforcement via SDP and NGN. The terms of contracts result in policies to enforce in the SDP and network. The OSS/BSS generates the policies that can be enforced. Further information on such use of policies can be obtained in U.S. patent application Ser. No. 11/024,160, filed Dec. 27, 2004, entitled "Policies as Workflows," as well as U.S. patent application Ser. No. 11/565,578, filed Nov. 30, 2006, entitled "Orchestration of Policy Engines and Format Technologies," each of which is hereby incorporated herein by reference. The enforcement of such policies is further described, for example, in U.S. patent application Ser. No. 10/856,588, filed May 28, 2004, entitled "Method and Apparatus for Supporting Service Enablers Via Service Request Composition," as well as U.S. patent application Ser. No. 10/855,999, filed May 28, 2004, entitled "Method and apparatus for supporting service enablers via service request handholding," and U.S. patent application Ser. No. 11/536,731, filed Sep. 29, 2006, entitled "Service Provider Functionality With Policy Enforcement Functional Layer Bound to SIP". Additional examples are provided below with discussion of using the resource management enabler to expose things such as network provisioning, RMO, and inventory integration.

It should become clear that in the bigger picture of integration, OSS and BSS are really just other types of applications. As with any other application, the BSS/OSS can be implemented on IT middleware like Oracle Fusion Middleware and SDP, and can rely on SOA and EDA as discussed above. In that view, OSS, BSS, and services run on SDP and interact with abstracted underlying network resources. This is also the way, with respect to FIG. 5(b), for example, that the network resources and legacy resources can be integrated and managed. The resources can be abstracted by enablers in the service layer that have life cycle management (sideways) and service (northbound) interfaces. Northbound interfaces can be used to execute the functions and/or compose. Life cycle management is one way in which they are integrated, driven, and interact with OSS/BSS as described. Underlying resources can be abstracted via southbound adapters, as is consistent with the notion of enablers and layered architecture disclosed in, for example, U.S. patent application Ser. No. 11/357,653, incorporated by reference above.

The resulting OSS/BSS/SDP integration at the service layer for legacy and NGN networks provides a unique new value proposition of business driven, low-touch life cycle management of resources in the service provider domain. This way, life cycle management moves from expert system administrators to being management driven by business process and marketing staff. OSS and BSS then also can be shared or federated across many different network technologies or providers, thereby providing consistent coexistence across networks as well as true convergence, where the customer experience is common across these networks and modules are able to adapt to the intrinsic characteristics of these networks. It is also essential in many cases in order to support continuity services, where services are started on one network and continued within same session on another network.

Figure 7:
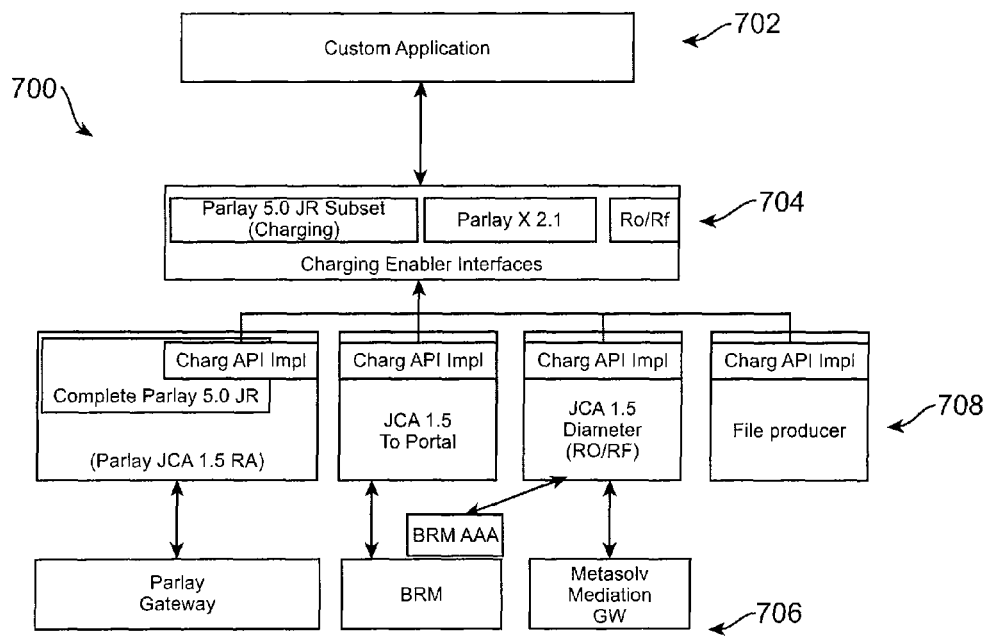
FIG. 7 illustrates an exemplary architecture including a charging enabler with one embodiment of the present invention.

In one embodiment, a billing and revenue management (BRM) system can take advantage of service-level charging in a service delivery platform. By utilizing a charging enabler, the BRM system can correlate and reconcile information and avoid problems such as double charging. FIG. 7 illustrates an exemplary architecture 700 that can be used to provide such a charging enabler 702 between the network layer 706 and the application layer 704. Such a charging enabler can provide both online and offline service level charging using a charging agent, as well as account management. The charging enabler in one embodiment is an SDP level component providing standards-based interfaces (e.g., APIs) for charging (northbound) including Parlay Charging (Java), Parlay Account Management (Java), Parlay X Payment (Web services), Parlay X Account Management (Web services), and Diameter RfRo (Java Diameter API). The service level charging can include, for example, balance checking and tracking, prerated charges, delegated rating, and rate inquiries. Such charging can be used with Open Mobile Architecture (OMA) and Parlay-based systems, for example. Charging drivers 708 can be used to connect southbound to realizations of the functions and can include IMS CCF (Diameter Rf)/OCS (Diameter Ro), Parlay Gateways, BRM, and file-based drivers. Any northbound interface should match to any southbound protocol (where applicable).

Figure 8:
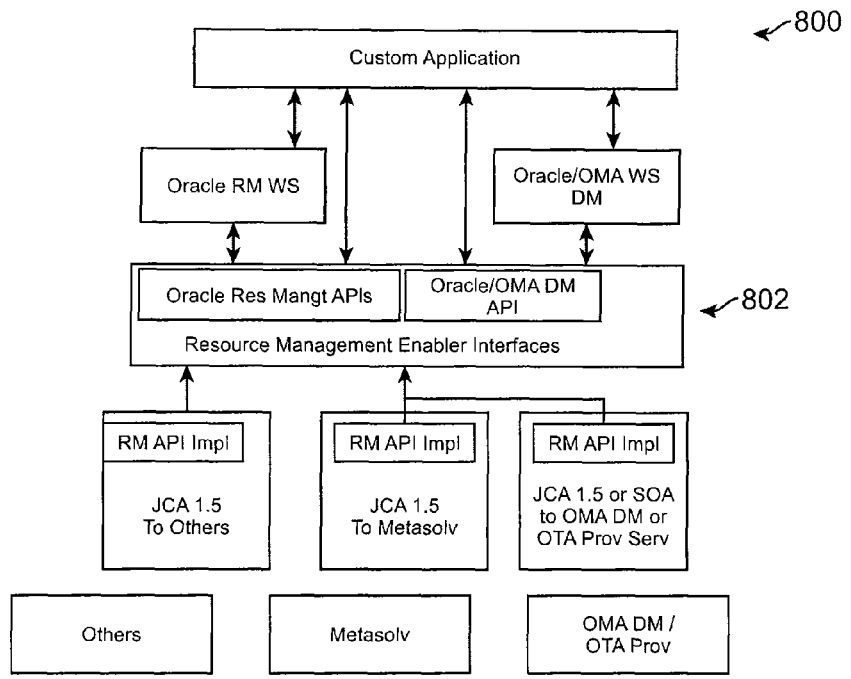
FIG. 8 illustrates an exemplary architecture including a resource management enabler in accordance with one embodiment of the present invention.

FIG. 8 illustrates an exemplary architecture 800 that can be used to provide a resource management enabler 802. A resource enabler can provide device and resource life cycle management, such as mobile/OTA management including legacy device provisioning (e.g., smart messaging). A resource enabler also can provide for activation and provisioning, such as for mobile phones, VoIP or soft phones, and client provisioning and activation (e.g., set-top boxes), as well as network provisioning and activation. A resource life cycle management enabler also can provide other life cycle management functions, such as managing inventories and providing monitoring, as well as installing, updating, monitoring, and retiring software.

Figure 9:
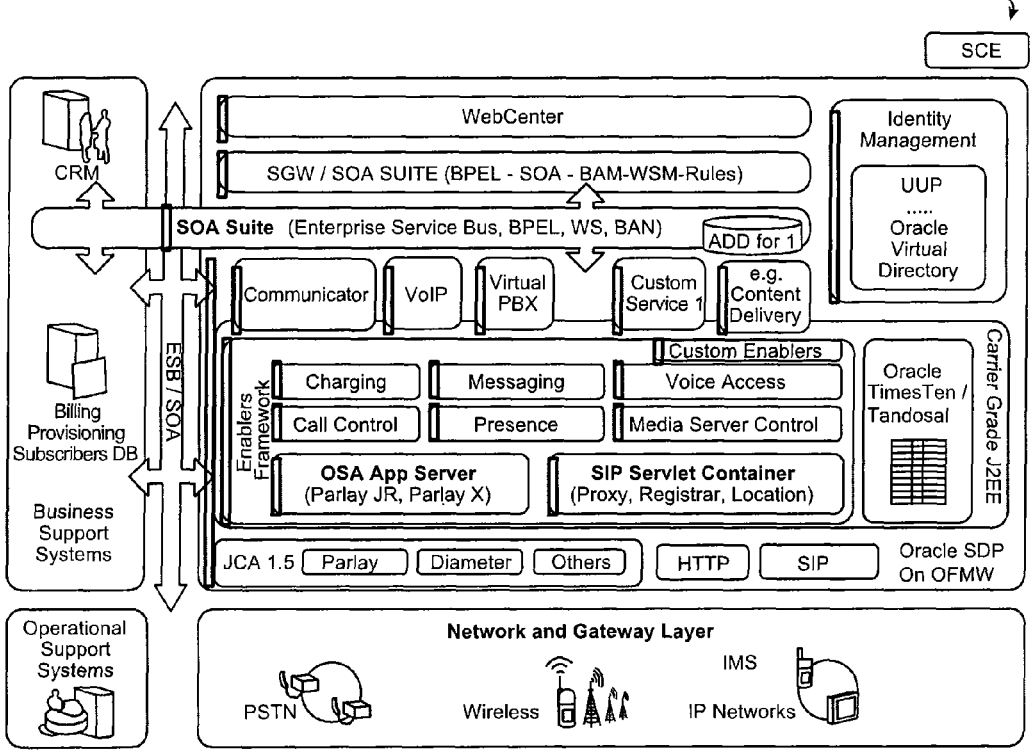
FIG. 9 illustrates a series of life cycle management interfaces (exposed by SDP/service layer element), showing where those interfaces should be exposed and to whom, in accordance with one embodiment of the present invention.

FIG. 9 illustrates a configuration 900 utilizing a series of life cycle management interfaces (shown as rectangles to the left of various components), whereby OSS and BSS processes are able to provision and activate the SDP components just like any other resources. Each SDP component (e.g., an enabler, containers, service/application and any composition of the above) is exposing life cycle management interfaces to that effect. In fact, these components need a way to describe their dependencies (what else is to be managed/available to support them), the interfaces for lifecycle management, etc. This is again captured in metadata that can be used to ensure that all dependencies are supported when lifecycle management steps are taking place. Life cycle management of network components is described elsewhere herein, such as with respect to FIG. 5(b).

Returning to FIG. 8, it should be mentioned that this is not simply enough to utilize a standard interface (e.g. a 1a WSDL in a UDDI), but it is necessary to provide for deployment, integration etc., such that southbound adapters can be deployed, for example. An enabler that provides device and resource life cycle management can include Mobile/OTA (e.g., OMA DM and legacy device provisioning [e.g. smart messaging]), activation and provisioning (e.g., VoIP/Soft phones and client provisioning and activation [e.g. set top boxes, SIMs, . . . ], Network provisioning and activation) and other life cycle management functions (e.g., inventories, RMO, monitoring. Install, update, monitor, and retiring of software). The enabler can also include JCA 1.5 adapters to MetaSolv (e.g., catridges to resources) and JCA 1.5 adapters to other management systems or directly to managed resources. It should be noted in FIG. 8 that the enabler talks to the MetaSolv that does the management. The enabler can also directly talk to the resources to perform lifecycle management of the resources (e.g., symbolized by Others) such as via JCA 1.5 as described for example in co-pending U.S. patent application Ser. No. 11/951,500, filed Dec. 6, 2007, entitled "Achieving Low Latencies on Network Events in a Non Real Time Platform," which is hereby incorporated herein by reference.

In another aspect, a run-time linkage can be provided between OSS and BSS components. When a software component is developed and made available, the component can be included as needed in inventory, a product catalog, a service catalog, a SW catalog/UDDI, etc. Metadata can be used (such as is described above) to describe the dependencies on other resources, as well as various provisioning and life cycle management aspects.

Figure 10:
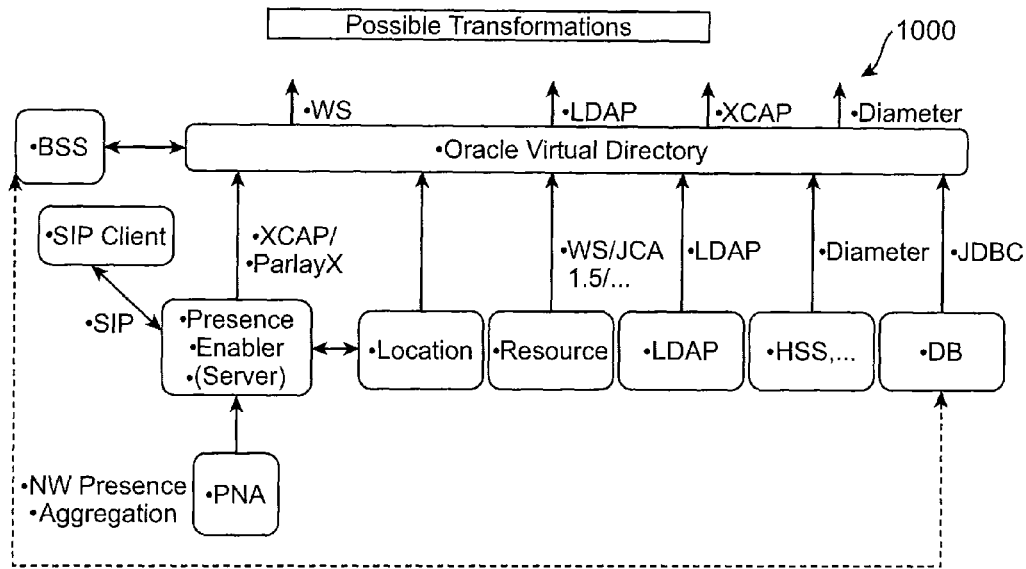
FIG. 10 illustrates an exemplary UUP-based architecture in accordance with one embodiment of the present invention.
Figure 11:
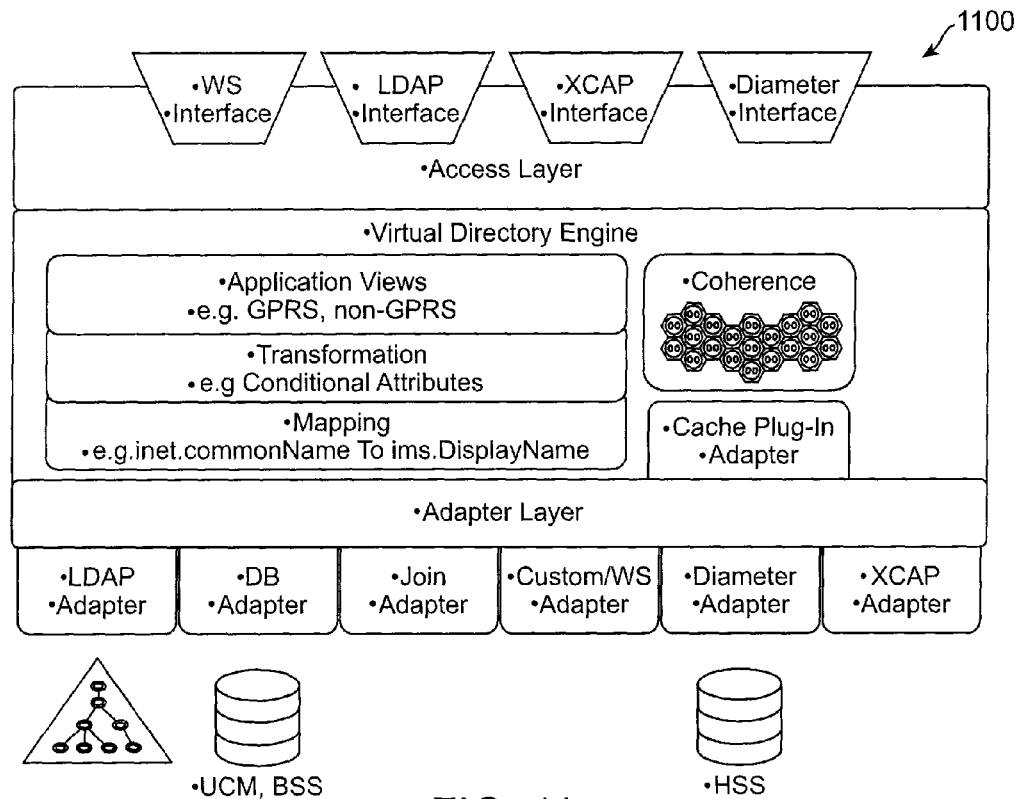
FIG. 11 illustrates an exemplary UUP-based architecture in accordance with one embodiment of the present invention.

Integration also can allow for linking with the unified user profile to perform functions such as exposing Universal Customer Master (UCM) management and master data management (MDM) functionality. As illustrated in the exemplary architecture 1000 of FIG. 10, a unified user profile of the virtual directory layer can aggregate the view of items and delegate subscriptions via calls to BSS/OSS. Such an approach can utilize customizable schema mapping, and customizable distributed caching and pre-fetching. The northbound interfaces also can be wrapped and transformed as needed. Northbound interfaces can include Java, SOAP/HTTP, LDAP, Diameter, OMA GSSM, and XCAP interfaces, for example. Southbound protocols can include LDAP, XCAP, JDBC, Web service, and Diameter protocols, for example. FIG. 11 illustrates an exemplary UUP architecture 1100 including an access layer, virtual directory layer, and adapter layer between the interfaces and system components.

Figure 12A:
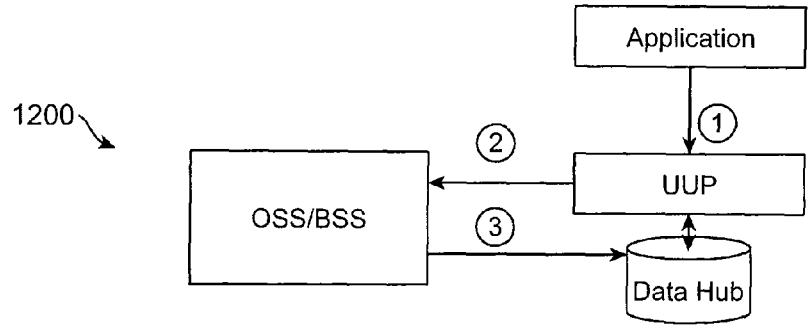
FIGS. 12(a) and 12(b) illustrate exemplary subscription management architectures in accordance with one embodiment of the present invention.
Figure 12B:
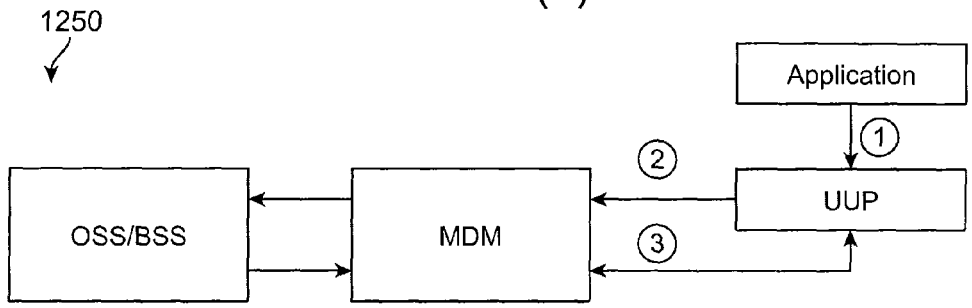

FIGS. 12(a) and 12(b) illustrate exemplary architectures 1200, 1250 for providing subscription/subscriber management in accordance with one embodiment. Further detail for such architectures is provided in the "Service Oriented Architecture (SOA) Management of Data Repository" application incorporated above. In one instance, the UUP directly implements the integration and data manipulations are delegated to OSS/BSS that, as a result, update the data seen/aggregated by the UUP. In another instance, the UUP performs the change on the database (e.g., MDM) that implements the integrations by launching SOA flows in OSS/BSS to match the data changes. Subscription management typically is a BSS operation, not a run-time or network operation. A subscription management component can integrate SuM, GSSM, and GUP with BSS to trigger operation and associated flows in/from BSS. In an integrated architecture, a request for subscription management may be passed to BSS, whereby BSS triggers MDM/UCM data updates and related flows. If no flow is triggered, updates can be done from UUP to a target repository. The behavior can be customizable and policy driven, for example. Run-time access an be provided via a UUP for service layer or network elements, provisioned by OSS/BSS, for lower layers such that there is not performance impact. Performances can be dictated by the repositories aggregated by the UUP, and caching and pre-fetch can be customizable.

Figure 13:
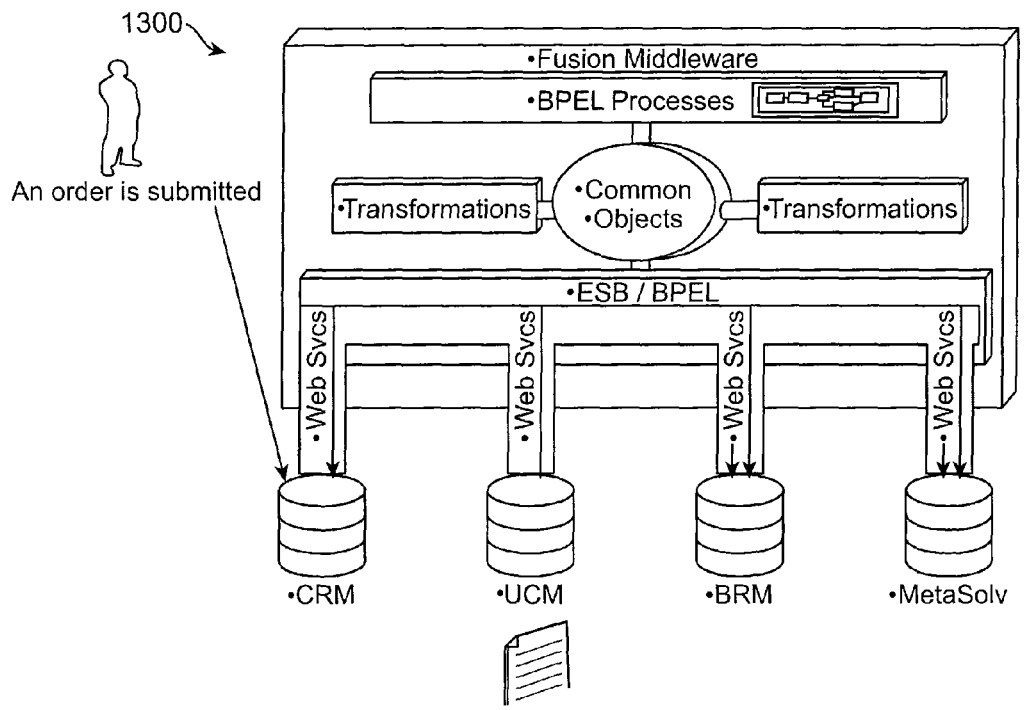
FIG. 13 illustrates an exemplary flow for subscription management in accordance with one embodiment of the present invention.

FIG. 13 illustrates an exemplary flow 1300 for customer data master integration and subscription management. In this example, when an order is submitted for a new customer, the order progresses to BRM and Metasolv, whereby it is verified whether the customer exists in UCM (Universal User Management—a component of Oracle MDM), and a new customer creation business event is triggered. UCM then subscribes to the event, does deduping, address cleansing, and master record creation, and then approves the new customer. A "new customer created" event is then triggered in UCM and the hub publishes the event describing the new customer. It is verified that the customer exists in MetaSolv and the order is sent to provisioning, whereby it is verified that the customer exists in the BRM system and the order is sent to billing. All the applications that subscribe to the UCM also get and process the record.

As new applications are built using other components, they can have tangible dependencies (i.e., calling other components or composed by other components) and intangible dependencies (i.e., need to have a particular bandwidth available to have this running or expect a subscription to another service or a certain type of client or phone). The tangible dependencies can be contained in the implementation and packaging of the new service. This is squarely an issue of the SCE and execution environment packaging story. The intangible dependencies are much more complicated. Thus, metadata can be used to model and accompany the life cycle management interfaces. The business requirements can involve how to describe and convey intangible dependencies when handling, re-programming, or composing a component so that these dependencies are satisfied when a service or product is created in CRM, when a customer orders the service or product, when fulfillment needs to take place, when trouble need to be resolved, etc.

Figure 14:
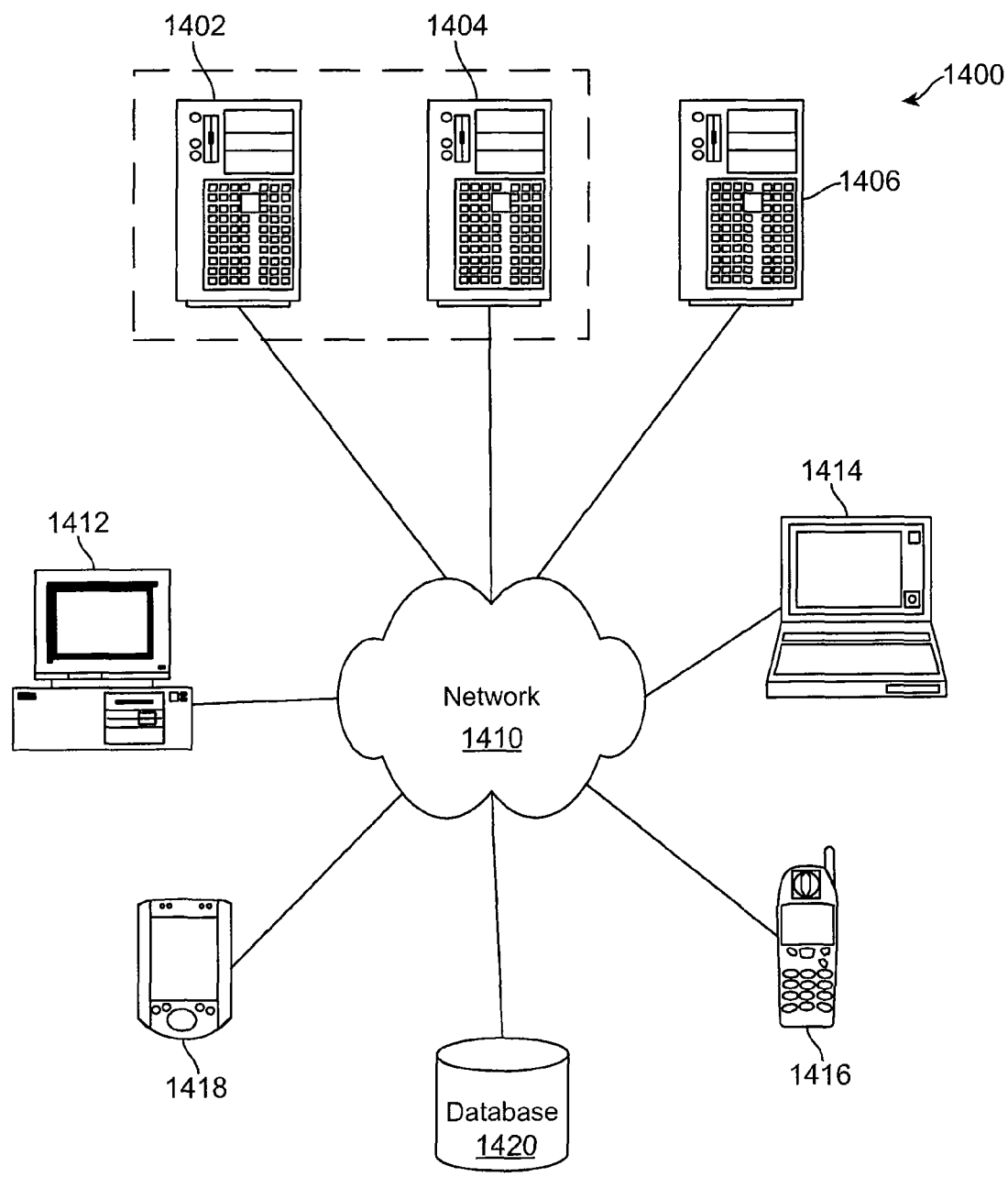
FIG. 14 illustrates components of a computer network that can be used in accordance with one embodiment of the present invention.

FIG. 14 is a block diagram illustrating components of an exemplary operating environment in which various embodiments of the present invention may be implemented. The system 1410 can include one or more user computers, computing devices, or processing devices 1412, 1414, 1416, 1418, which can be used to operate a client, such as a dedicated application, web browser, etc. The user computers 1412, 1414, 1416, 1418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1412, 1414, 1416, 1418 may also have any of a variety of applications, including one or more development systems, database client and/or server applications, and Web browser applications. Alternatively, the user computers 1412, 1414, 1416, 1418 may be any other electronic device, such as a thin-client computer, Internet-enabled gaming system, and/or personal messaging device, capable of communicating via a network (e.g., the network 1410 described below) and/or displaying and navigating Web pages or other types of electronic documents. Although the exemplary system 1400 is shown with four user computers, any number of user computers may be supported.

In most embodiments, the system 1400 includes some type of network 1410. The network may can be any type of network familiar to those skilled in the art that can support data communications using any of a variety of commercially-available protocols, including without limitation TCP/IP, SNA, IPX, AppleTalk, and the like. Merely by way of example, the network 1410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1402, 1404, 1406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1406) may be dedicated to running applications, such as a business application, a Web server, application server, etc. Such servers may be used to process requests from user computers 1412, 1414, 1416, 1418. The applications can also include any number of applications for controlling access to resources of the servers 1402, 1404, 1406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1412, 1414, 1416, 1418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1412, 1414, 1416, 1418.

The system 1400 may also include one or more databases 1420. The database(s) 1420 may reside in a variety of locations. By way of example, a database 1420 may reside on a storage medium local to (and/or resident in) one or more of the computers 1402, 1404, 1406, 1412, 1414, 1416, 1418. Alternatively, it may be remote from any or all of the computers 1402, 1404, 1406, 1412, 1414, 1416, 1418, and/or in communication (e.g., via the network 1410) with one or more of these. In a particular set of embodiments, the database 1420 may reside in a storage-area network ("SAN") familiar to those skilled in the art. Similarly, any necessary files for performing the functions attributed to the computers 1402, 1404, 1406, 1412, 1414, 1416, 1418 may be stored locally on the respective computer and/or remotely, as appropriate. In one set of embodiments, the database 1420 may be a relational database, such as Oracle 10 g, that is adapted to store, update, and retrieve data in response to SQL-formatted commands.

Figure 15:
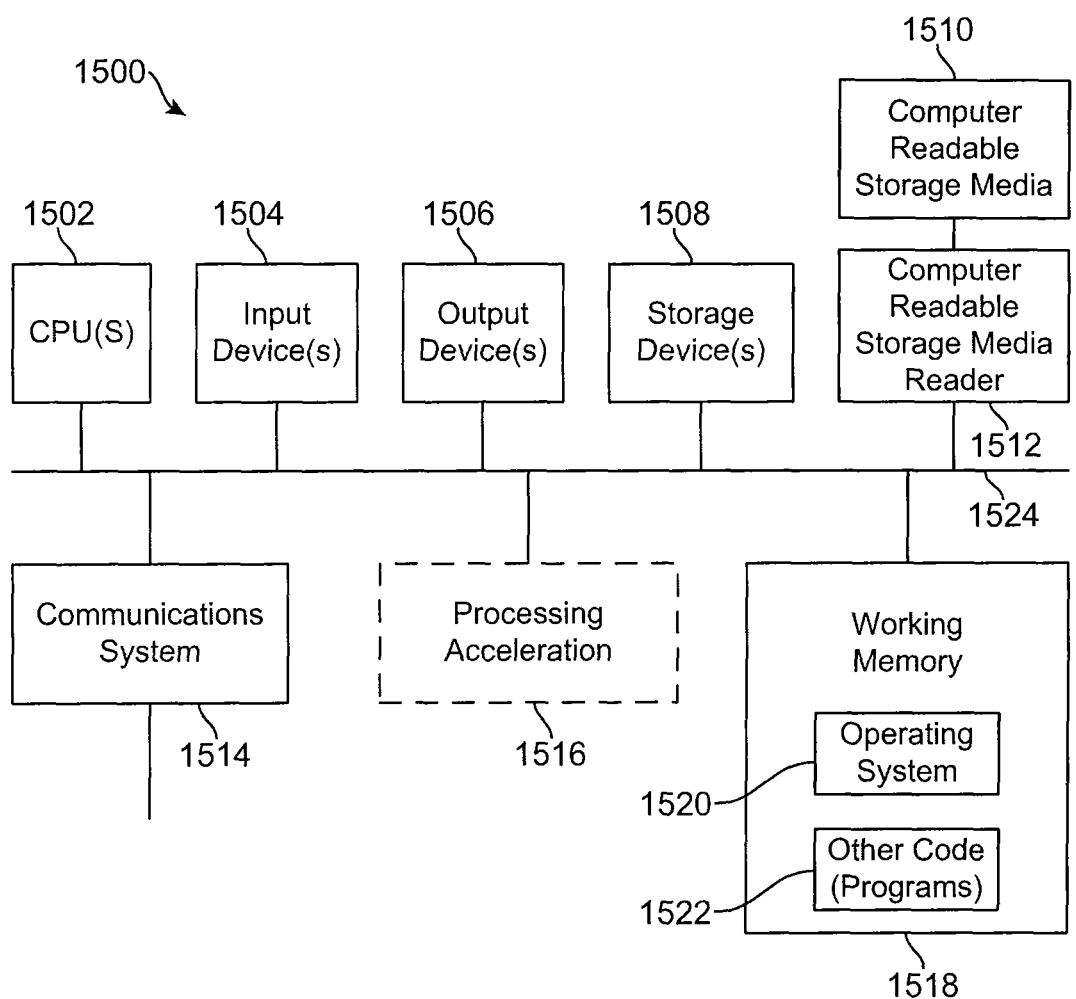
FIG. 15 illustrates components of a computerized device that can be used in accordance with one embodiment of the present invention.

FIG. 15 illustrates an exemplary computer system 1500, in which various embodiments of the present invention may be implemented. The system 1500 may be used to implement any of the computer systems described above. The computer system 1500 is shown comprising hardware elements that may be electrically coupled via a bus 1524. The hardware elements may include one or more central processing units (CPUs) 1502, one or more input devices 1504 (e.g., a mouse, a keyboard, etc.), and one or more output devices 1506 (e.g., a display device, a printer, etc.). The computer system 1500 may also include one or more storage devices 1508. By way of example, the storage device(s) 1508 can include devices such as disk drives, optical storage devices, solid-state storage device such as a random access memory ("RAM") and/or a read-only memory ("ROM"), which can be programmable, flash-updateable and/or the like.

The computer system 1500 may additionally include a computer-readable storage media reader 1512, a communications system 1514 (e.g., a modem, a network card (wireless or wired), an infra-red communication device, etc.), and working memory 1518, which may include RAM and ROM devices as described above. In some embodiments, the computer system 1500 may also include a processing acceleration unit 1516, which can include a digital signal processor DSP, a special-purpose processor, and/or the like.

The computer-readable storage media reader 1512 can further be connected to a computer-readable storage medium 1510, together (and, optionally, in combination with storage device(s) 1508) comprehensively representing remote, local, fixed, and/or removable storage devices plus storage media for temporarily and/or more permanently containing, storing, transmitting, and retrieving computer-readable information. The communications system 1514 may permit data to be exchanged with the network and/or any other computer described above with respect to the system 1500.

The computer system 1500 may also comprise software elements, shown as being currently located within a working memory 1518, including an operating system 1520 and/or other code 1522, such as an application program (which may be a client application, Web browser, mid-tier application, RDBMS, etc.). It should be appreciated that alternate embodiments of a computer system 1500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of integrating components for processing a request, comprising:
providing by a computer system executing a Service Delivery Platform (SDP) an architecture for supporting a plurality of independent components, the architecture providing for the direction and transformation of messages between the independent components, whereby the independent components are able to perform tasks and delegate tasks to other components;
managing by the computer system executing the SDP a unified identity for an authorized principal across the plurality of independent components on two or more different networks for sharing the processing of the request across the plurality of independent components, the unified identity corresponding to and identifying the authorized principal;
providing by the computer system executing the SDP a unified user profile for the unified identity, the unified user profile mapping the unified identity to two or more different identities corresponding to and identifying the authorized principal and having different user profiles on the plurality of independent components, the unified user profile providing an aggregated common view of all data about the two or more different identities corresponding to and identifying the authorized principal across the plurality of independent components based on the mapping; and
in response to receiving the request or an action corresponding to the request, initiating by the computer system executing the SDP a workflow to process the request using the plurality of independent components and the unified user profile, wherein the workflow causes the SDP to delegate one or more tasks to one or more of the independent components based on the unified user profile.

2. A method according to claim 1, wherein:
the independent components include two or more of an operational support system (OSS) component, a business support system (BSS) component, a runtime component, a service delivery platform (SDP) component, a network component, and in industry-specific component.

3. A method according to claim 1, further comprising:
exposing by the computer system executing the SDP at least one function of the independent components as one or more enablers operable to drive the function and using a northbound interface independent of the independent components.

4. A method according to claim 1, wherein the workflow is initiated by an application for one of the independent components.

5. A method according to claim 1, wherein:
the architecture includes at least one of a service-oriented architecture (SOA) and an event-driven architecture (EDA).

6. A method according to claim 3, wherein:
the independent components and any services used for processing interact with abstracted underlying network resources via the one or more enablers.

7. A method according to claim 6, wherein:
the one or more enablers include at least one of a charging, resource lifecycle management, resource management, mobile, voice access, communications, presence, messaging, call control, media server control, and service enabler.

8. A method according to claim 7, further comprising:
providing by each of the enablers an interface allowing for the deployment and integration of southbound adapters to the network resources.

9. A method according to claim 1, wherein:
applications executing on the independent components include two or more of a rate charging application, a billing analysis application, a business activity monitoring application, a revenue sharing application, a third party management application, a business intelligence application, a subscription management application, a financial bookkeeping application, an enterprise resource planning (ERP), a network management, an MW management, and a content management application.

10. A method according to claim 1, further comprising:
capturing by the computer system executing the SDP information associated with one of the services or independent components as metadata.

11. A method according to claim 10, wherein:
the metadata is associated with code created to describe intangible dependencies so that any manipulation the independent components or an associated asset takes the intangible dependencies into account.

12. A method according to claim 1, further comprising:
building at least one application on the computer system executing the SDP that utilizes the integrated components.

13. A method according to claim 1, further comprising:
managing by the computer system executing the SDP a flow relating to the request from a starting point to an ending point for a business process associated with the request.

14. A method according to claim 1, further comprising:
utilizing by the computer system executing the SDP a canonical data model for managing the processing, the canonical data model transforming messages and storing a status of the processing.

15. A method according to claim 14, wherein:
the canonical data model also provides for at least one of marshalling a complete process flow and error message handling for the process flow.

16. A method according to claim 1, further comprising:
providing by the computer system executing the SDP a proximity service as part of the architecture.

17. A method according to claim 1, further comprising:
providing by the computer system executing the SDP for real time revenue sharing with a third party.

18. A method according to claim 17, further comprising:
allowing by the computer system executing the SDP the third party to view balance and usage information as part of the real time revenue sharing.

19. A system for integrating components to process a request, comprising:
a processor; and
a memory storage device including instructions that, when executed by the processor, cause the processor to:
provide for a direction and transformation of messages between a plurality of independent components using an architecture that allows the independent components to perform tasks and delegate tasks to other components to process a received request;
manage a unified identity for an authorized principal across the plurality of independent components on two or more different networks in order to provide for sharing the processing of the request across the plurality of independent components, the unified identity corresponding to and identifying the authorized principal;
provide a unified user profile for the unified identity, the unified user profile mapping the unified identity to two or more different-identities corresponding to and identifying the authorized principal and having different user profiles on the plurality of independent components, the unified user profile providing an aggregated common view of all data about the two or more different identities corresponding to and identifying the authorized principal across the plurality of independent components based on the mapping; and
in response to receiving the request or an action corresponding to the request, initiate a workflow to process the request using the plurality of independent components and the unified user profile, wherein the workflow causes the SDP to delegate one or more tasks to one or more of the independent components based on the unified user profile.

20. A system according to claim 19, wherein:
the independent components include two or more of an operational support system (OSS) component, a business support system (BSS) component, a runtime component, a service delivery platform (SDP) component, a network component, and in industry-specific component.

21. A system according to claim 19, further comprising:
a plurality of enablers for exposing functions of the independent components.

22. A system according to claim 19, wherein:
the architecture includes at least one of a service-oriented architecture (SOA) and an event-driven architecture (EDA).

23. A system according to claim 21, wherein:
the independent components and any services used for processing run on a service delivery platform (SDP) and interact with abstracted underlying network resources via the enablers.

24. A system according to claim 19, further comprising:
at least one interface in a run time environment for exposing a life cycle management of the plurality of independent components or related resources.

25. A computer readable memory having stored therein a sequence of instructions which, when executed by a processor, cause the processor to integrate components to process a request by:
- providing an architecture for supporting a plurality of independent components, the architecture providing for the direction and transformation of messages between the independent components, whereby the independent components are able to perform tasks and delegate tasks to other components;
- managing a unified identity for an authorized principal across the plurality of independent components on two or more different networks in order to provide for sharing the processing of the request across the plurality of independent components, the unified identity corresponding to and identifying the authorized principal;
- provide a unified user profile for the unified identity, the unified user profile mapping the unified identity to two or more different identities corresponding to and identifying the authorized principal and having different user profiles on the plurality of independent components, the unified user profile providing an aggregated common view of all data about the two or more different identities corresponding to and identifying the authorized principal across the plurality of independent components based on the mapping; and
- in response to receiving the request or an action corresponding to the request, initiating a workflow to process the request using the plurality of independent components and the unified user profile, wherein the workflow causes the SDP to delegate one or more tasks to one or more of the independent components based on the unified user profile.

26. A computer readable memory according to claim 25, further comprising:
- exposing functions of the independent components as enablers operable to drive the functions.

27. A computer readable memory according to claim 25, further comprising:
- running the independent components and any services used for processing on a service delivery platform (SDP).

* * * * *

UNITED STATES PATENT AND TRADEMARK OFFICE
CERTIFICATE OF CORRECTION

Page 1 of 1

PATENT NO. : 8,966,498 B2
APPLICATION NO. : 12/019335
DATED : February 24, 2015
INVENTOR(S) : Maes It is certified that error appears in the above-identified patent and that said Letters Patent is hereby corrected as shown below:

On the title page

On page 4, column 1, item 56 under Other Publications, line 25, delete "Wikipedlia," and insert -- Wikipedia, --, therefor.

In the specification

In column 7, line 11, delete "sales/froms)." and insert -- sales/forms). --, therefor.

In column 14, line 26, delete "catridges" and insert -- cartridges --, therefor.

In column 15, line 15, delete "an be" and insert -- can be --, therefor.

Signed and Sealed this
Thirteenth Day of October, 2015

Michelle K. Lee
*Director of the United States Patent and Trademark Office*